US008688729B2

(12) United States Patent
Gagliardi et al.

(10) Patent No.: US 8,688,729 B2
(45) Date of Patent: *Apr. 1, 2014

(54) EFFICIENTLY COLLECTING TRANSACTION-SEPARATED METRICS IN A DISTRIBUTED ENVIROMENT

(75) Inventors: Marco Gagliardi, Brisbane, CA (US); Vladimir Umansky, Newton, MA (US)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,143

(22) Filed: Aug. 16, 2011

(65) Prior Publication Data

US 2013/0046779 A1  Feb. 21, 2013

(51) Int. Cl.
  *G06F 17/30* (2006.01)
(52) U.S. Cl.
  USPC .......................................... 707/769; 719/317
(58) Field of Classification Search
  USPC ............ 707/769, 802; 719/317; 717/125–128
  See application file for complete search history.

(56) References Cited

U.S. PATENT DOCUMENTS

| | | | |
|---|---|---|---|
| 6,813,587 B2 | 11/2004 | McIntyre et al. | |
| 6,823,355 B1 | 11/2004 | Novaes et al. | |
| 7,246,144 B2 | 7/2007 | Walsh et al. | |
| 7,818,418 B2 | 10/2010 | Bansal et al. | |
| 7,870,431 B2 | 1/2011 | Cirne et al. | |
| 2003/0174165 A1 | 9/2003 | Barney | |
| 2004/0078691 A1* | 4/2004 | Cirne et al. ..................... | 714/38 |
| 2005/0222689 A1 | 10/2005 | Smith et al. | |
| 2007/0143323 A1 | 6/2007 | Vanrenen et al. | |
| 2007/0143743 A1 | 6/2007 | Cobb et al. | |
| 2007/0169052 A1 | 7/2007 | Vanrenen et al. | |
| 2007/0266045 A1* | 11/2007 | Bansal et al. ............... | 707/104.1 |
| 2010/0281488 A1 | 11/2010 | Krishnamurthy et al. | |

OTHER PUBLICATIONS

Rakvic et al., "Completion Time Multiple Branch Prediction for Enhancing Trace Cache Performance", Carnegie Mellon University, Mar. 21, 2000, 13 pages.*
U.S. Appl. No. 13/211,163, filed Aug. 16, 2011.
Extended European Search Report dated Dec. 7, 2012, European Patent Application No. 12180548.5.
Non-final Office Action dated Jun. 10, 2013, U.S. Appl. No. 13/211,163, filed Aug. 16, 2011.
Paul, Raymond A., "Metrics Based Classification Trees for Software Test Monitoring and Management," Sixth International Conference on Tools with Artificial Intelligence, pp. 534-540, IEEE, Nov. 1994.

(Continued)

*Primary Examiner* — Monica Pyo
(74) *Attorney, Agent, or Firm* — Vierra Magen Marcus LLP

(57) ABSTRACT

Transaction-segregated metrics are obtained for component invocations of different transactions of an application. Corresponding tree data structures are maintained by an agent and a manager which describe sequences of invoked components of the different transactions. The start and end of each component are each represented by a node in each branch of the tree data structure. Each transaction is identified by matching a branch to a transaction trace. Gatherers are linked to one or more nodes to collect the transaction-segregated metrics. For example, metrics can be gathered separately for component invocations in different transactions. Metrics can also be gathered together for instances of different components in one or more transactions. A user interface includes a directed graph having vertices connected by edges. Edge portions are visually distinguished from one another based on the metrics of the gatherers. Each edge portion can be associated with one or more of the gatherers.

19 Claims, 31 Drawing Sheets

(56) References Cited

OTHER PUBLICATIONS

Response to Office Action dated Aug. 19, 2013, European Patent Application No. 12180548.5.
Response to Office Action dated Sep. 10, 2013, U.S. Appl. No. 13/211,163, filed Aug. 16, 2011.
Final Office Action dated Nov. 5, 2013, U.S. Appl. No. 13/211,163, filed Aug. 16, 2011.
European Examination Report dated Dec. 5, 2013, European Patent Application No. 12180548.5.

* cited by examiner

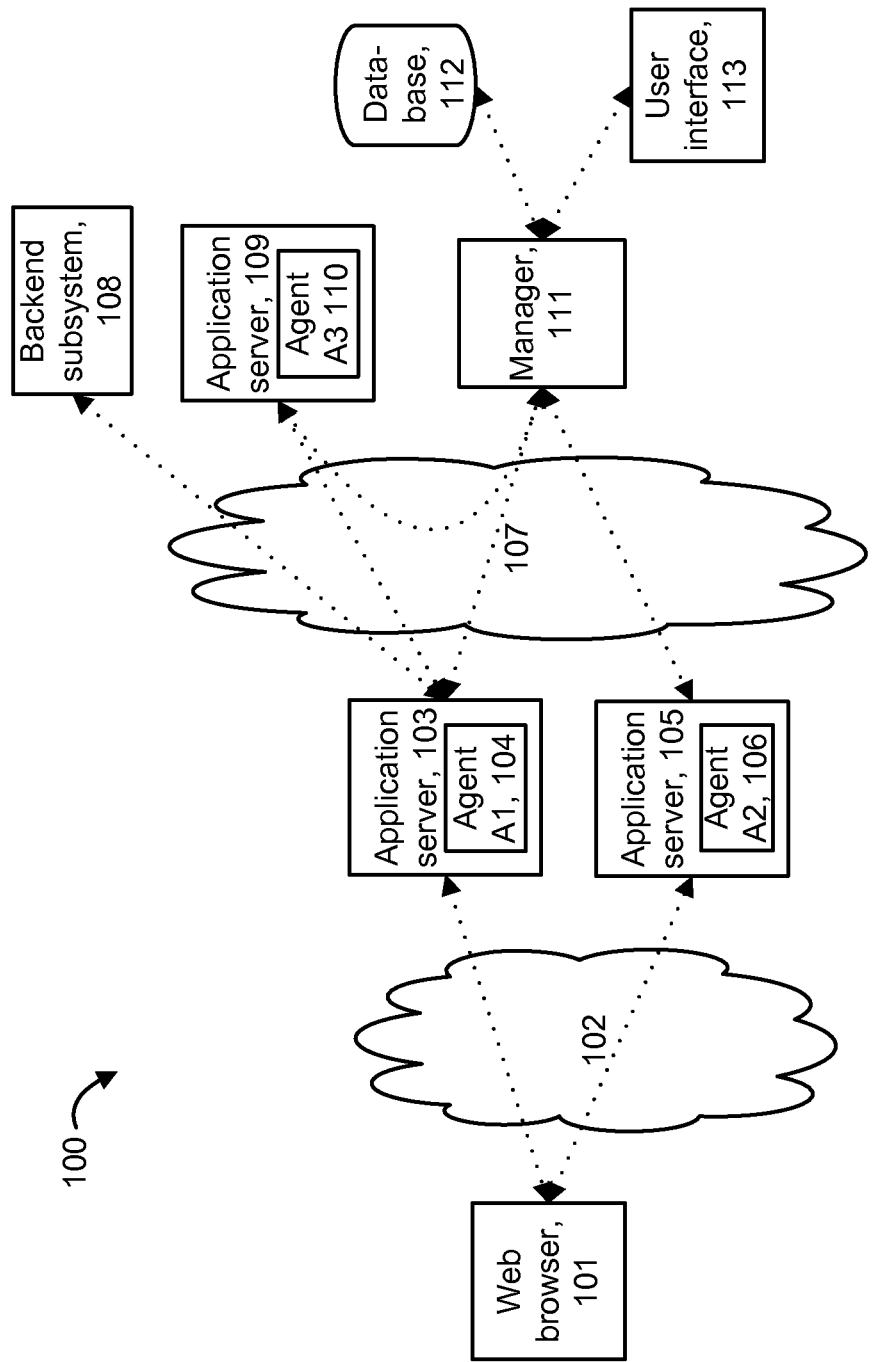

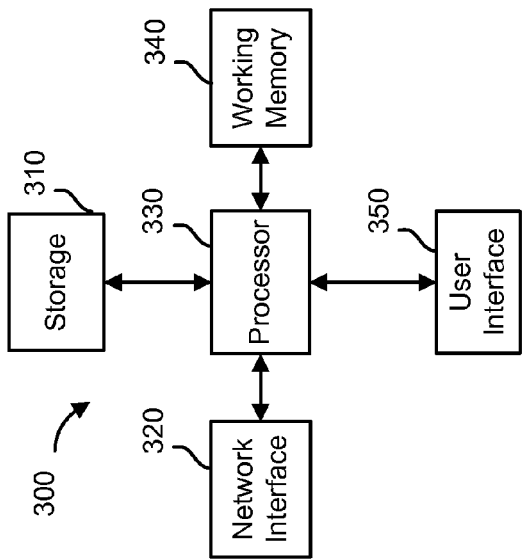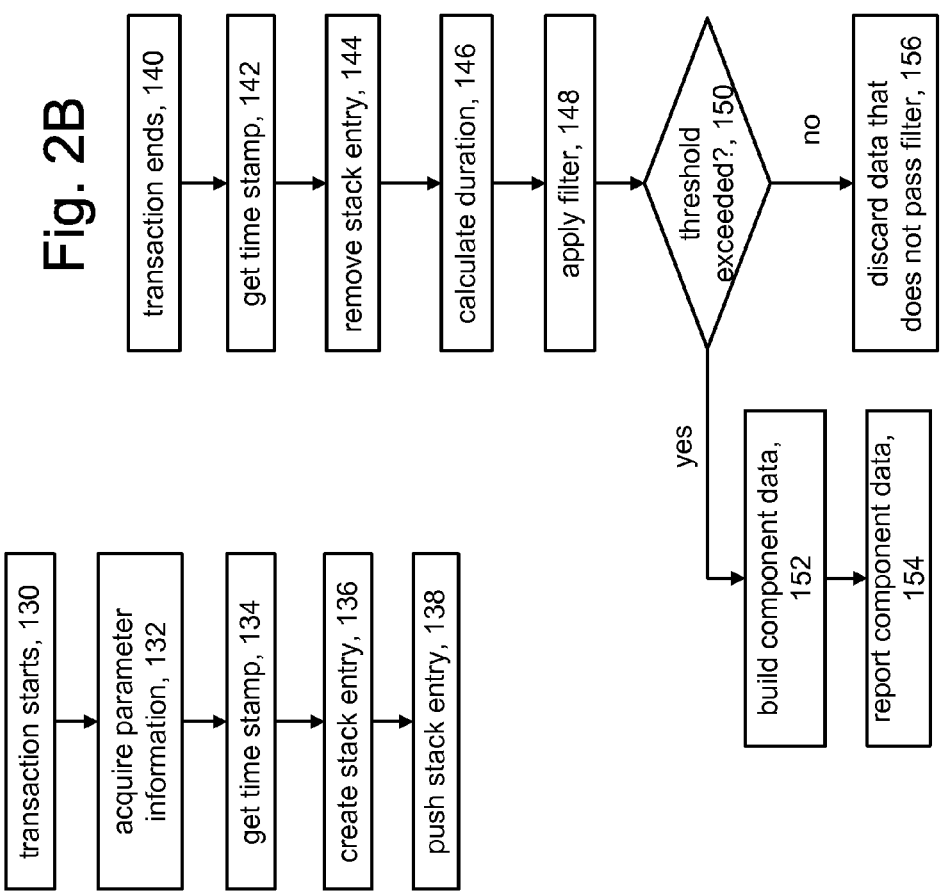

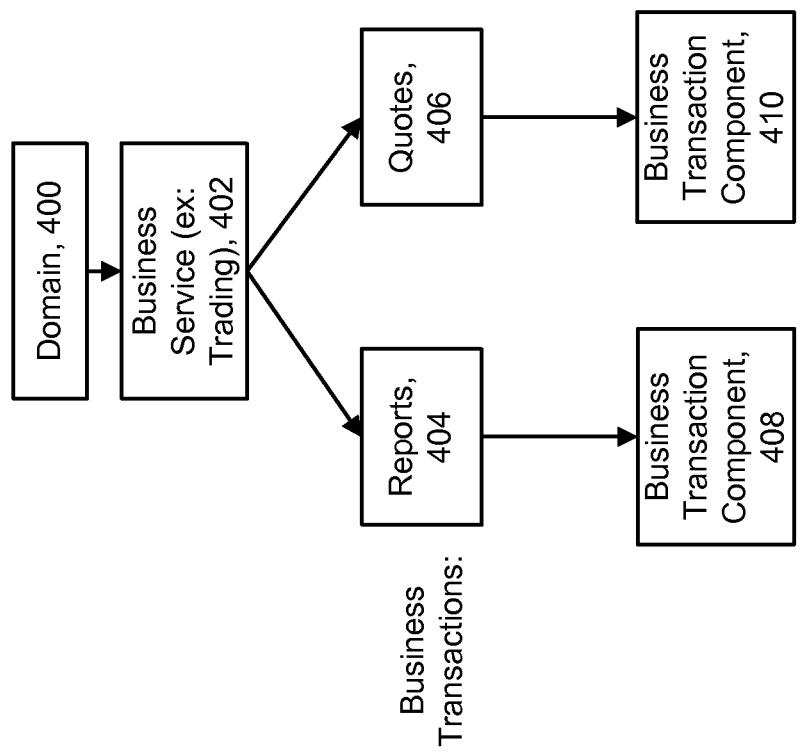

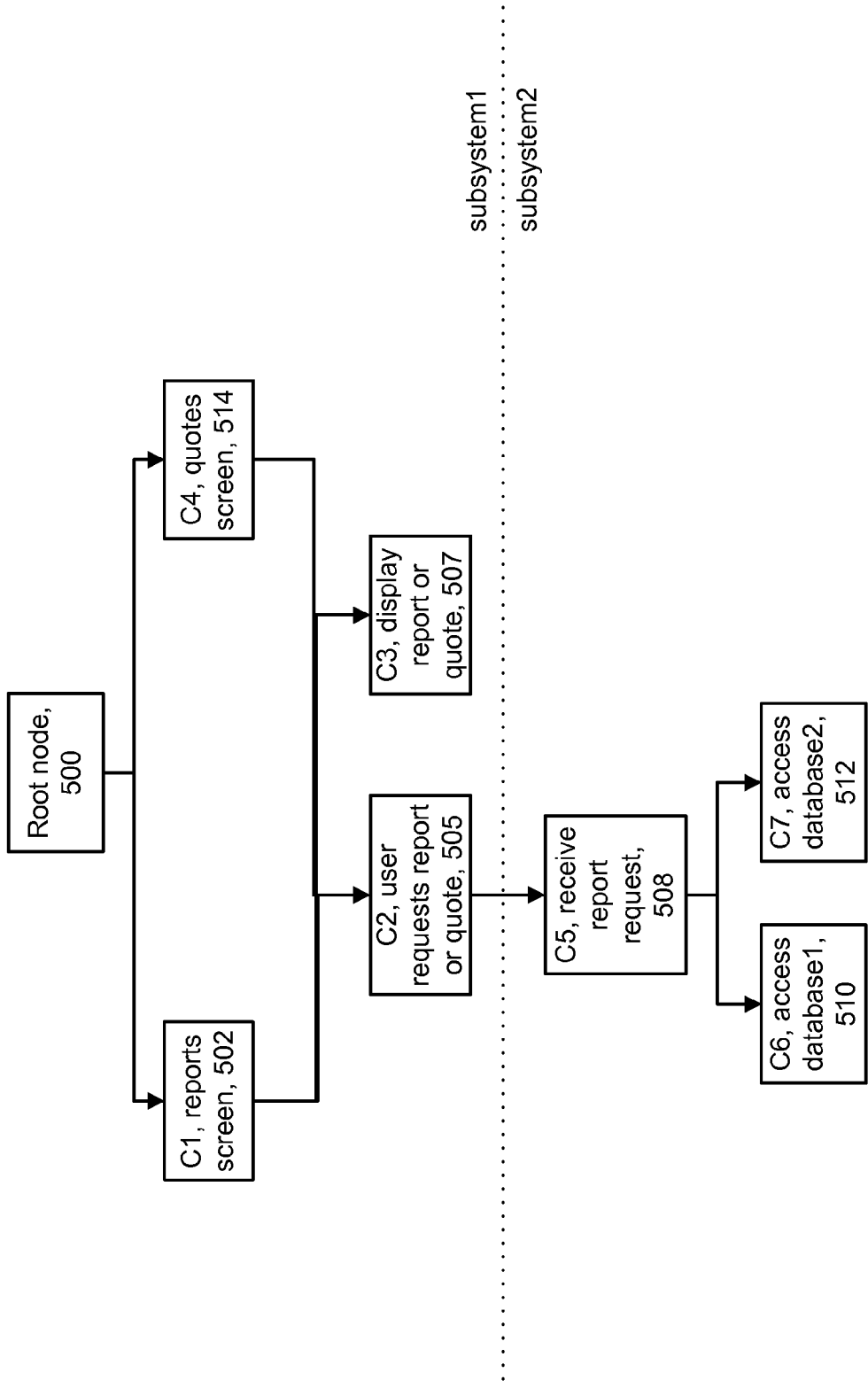

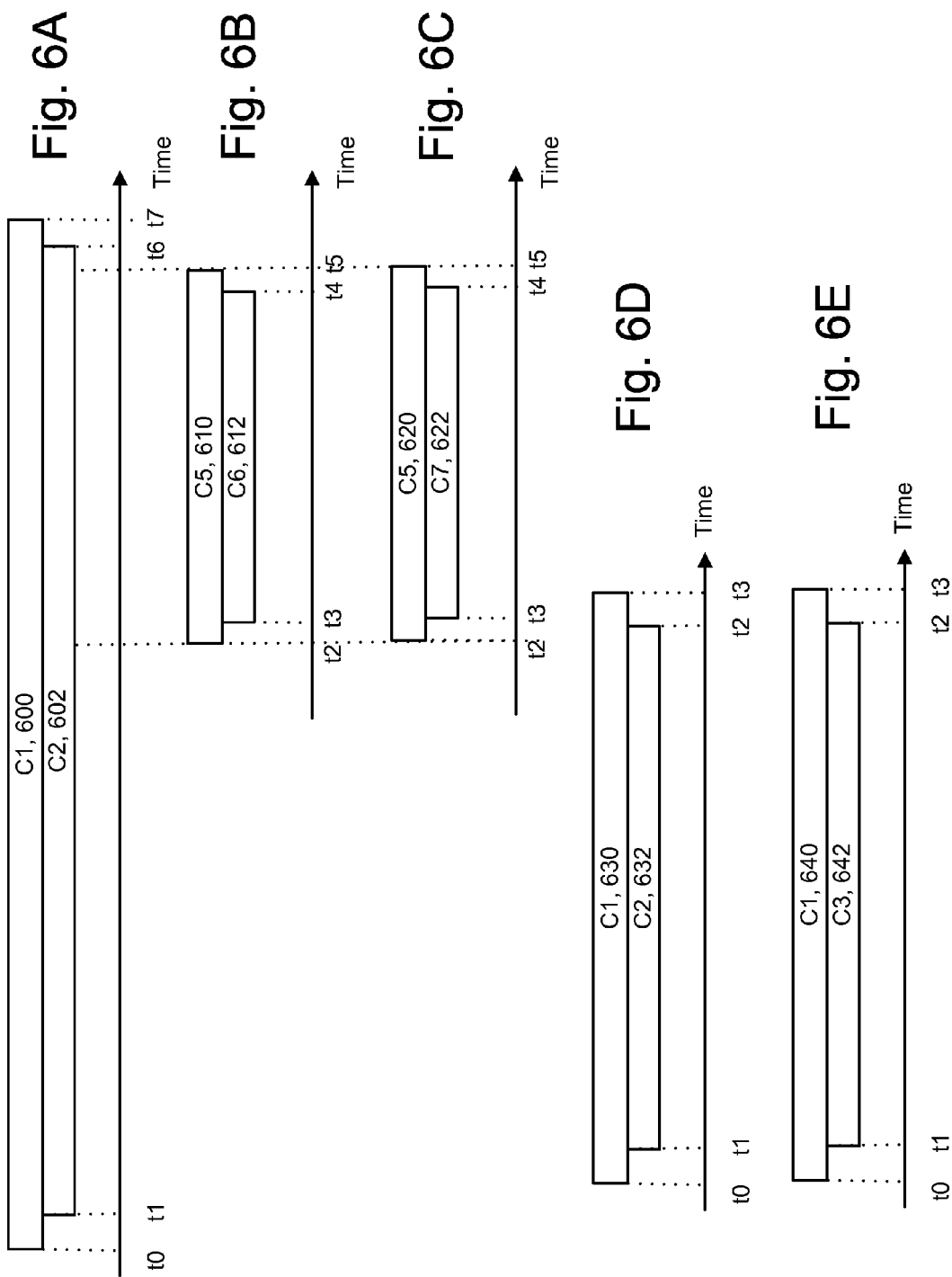

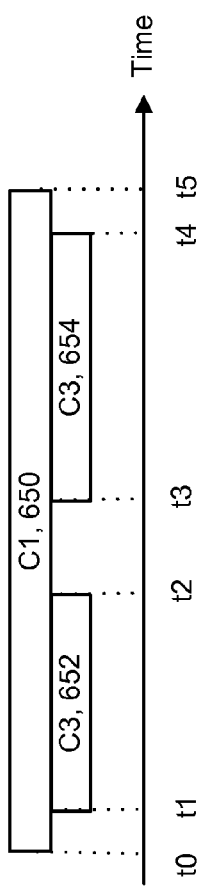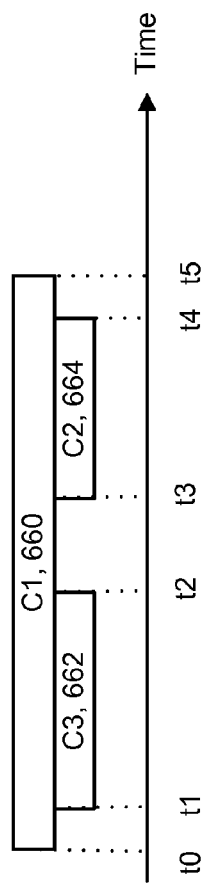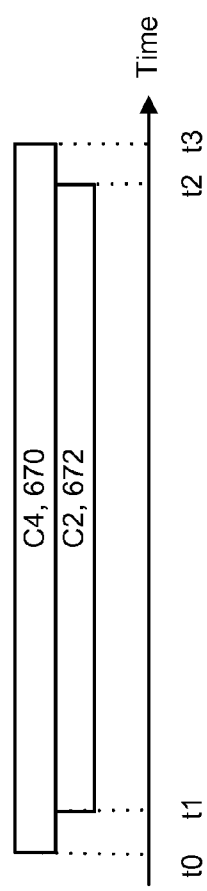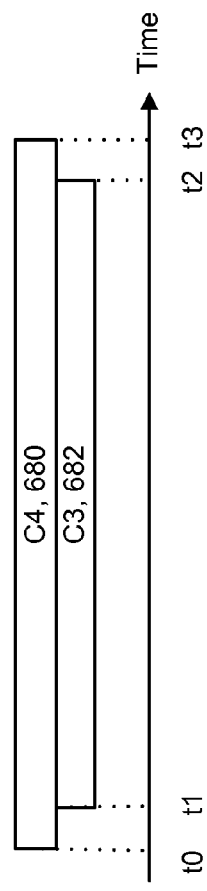

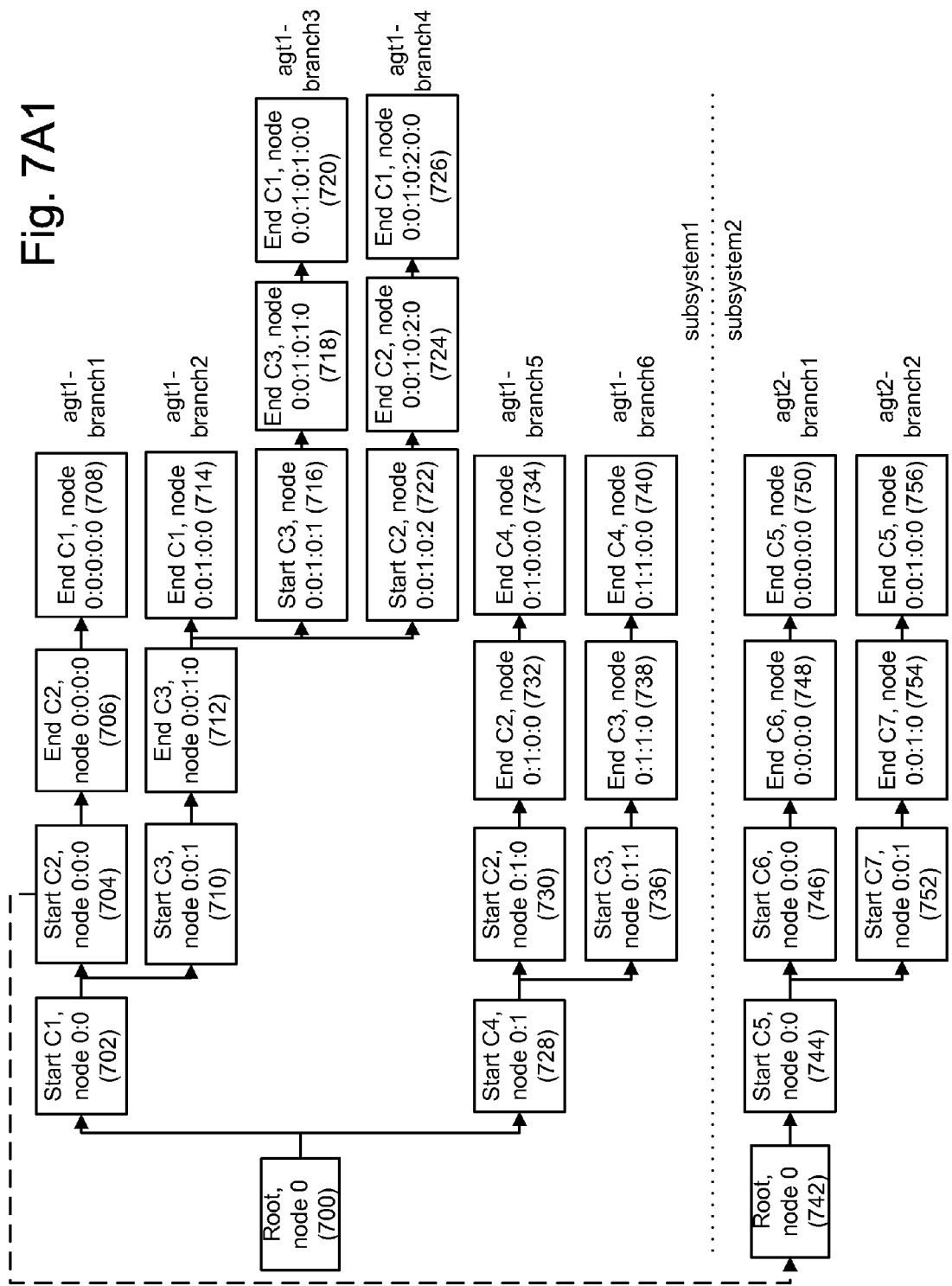
Fig. 7A1

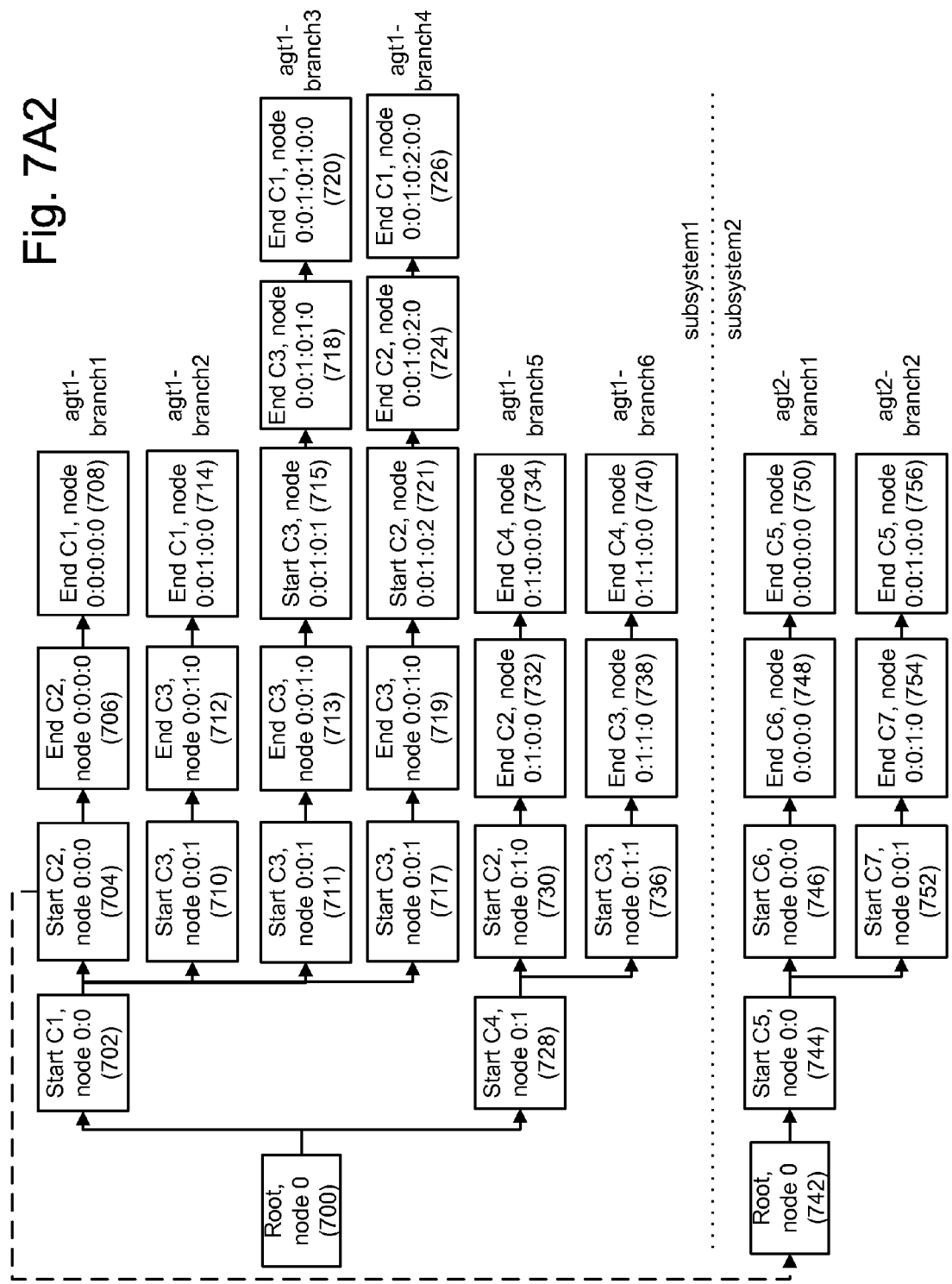
Fig. 7A2

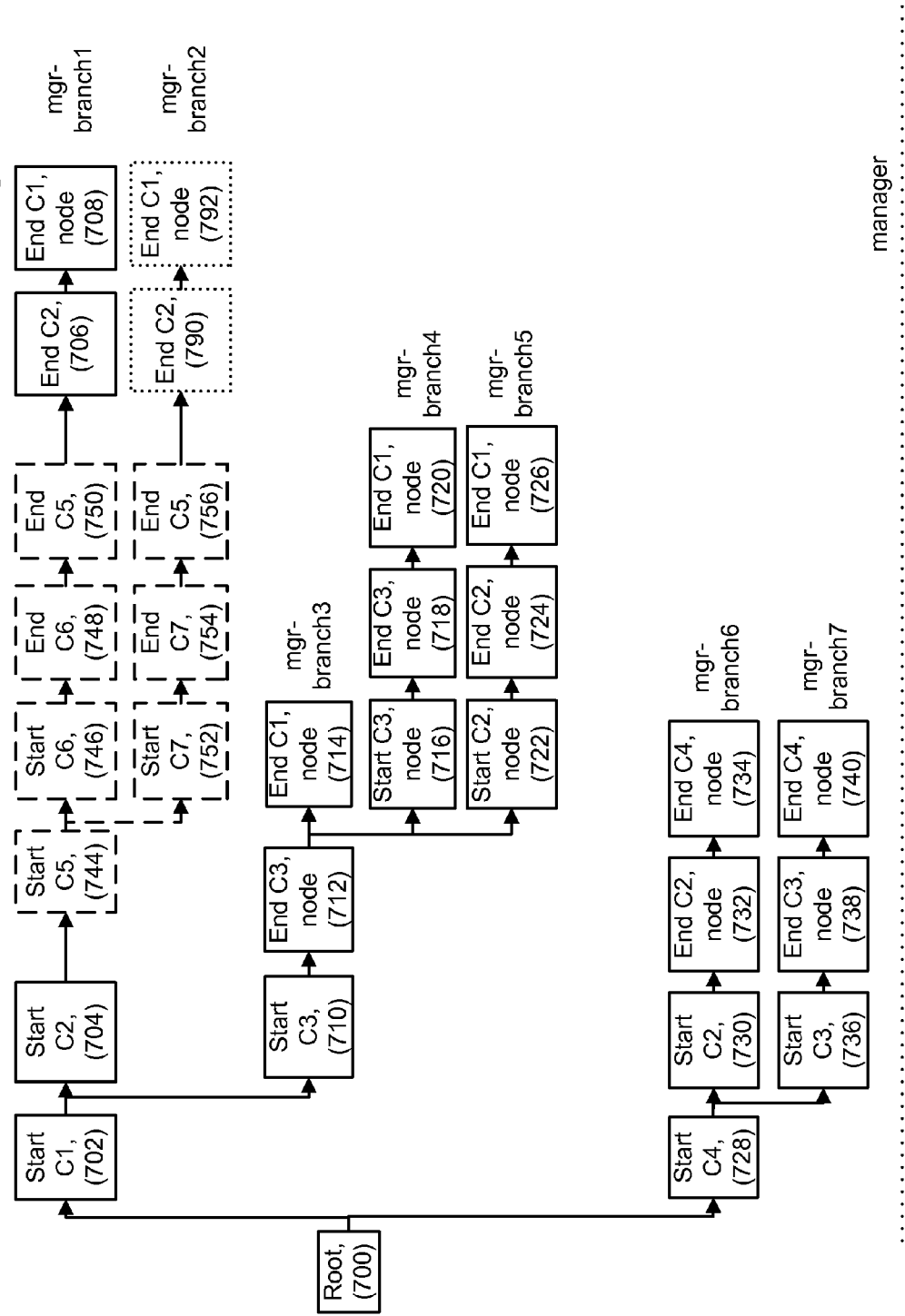

Fig. 7C2

Agent-manager last node correspondence

| Node: | Manager Last node of branch: | Agent1 Last node of branch: | Agent2 Last node of branch: |
|---|---|---|---|
| 708 | 0:0:0:0:0:0:0:0 | 0:0:0:0:0 | |
| 792 | 0:0:0:0:1:0:0:0 | 0:0:0:0:0 | |
| 750 | 0:0:0:0:0:0:0 | | 0:0:0:0:0 |
| 756 | 0:0:0:0:1:0:0 | | 0:0:0:0:0 |
| 714 | 0:0:1:0:0 | 0:0:1:0:0 | |
| 720 | 0:0:1:0:1:0:0 | 0:0:1:0:1:0:0 | |
| 726 | 0:0:1:0:2:0:0 | 0:0:1:0:2:0:0 | |
| 734 | 0:1:0:0:0 | 0:1:0:0:0 | |
| 740 | 0:1:1:0:0 | 0:1:1:0:0 | |

Fig. 8A1

Branch definitions-subsystem1

| Last node of branch: | Branch: | Transaction: | Component invocations: |
|---|---|---|---|
| 0:0:0:0:0 | agt1-branch1 | agt1-T1 | start C1, start C2, end C2, end C1 |
| 0:0:1:0:0 | agt1-branch2 | agt1-T2 | start C1, start C3, end C3, end C1 |
| 0:0:1:0:1:0:0 | agt1-branch3 | agt1-T3 | start C1, start C3, end C3, start C3, end C3, end C1 |
| 0:0:1:0:2:0:0 | agt1-branch4 | agt1-T4 | start C1, start C3, end C3, start C2, end C2, end C1 |
| 0:1:0:0 | agt1-branch5 | agt1-T5 | start C4, start C2, end C2, end C4 |
| 0:1:1:0:0 | agt1-branch6 | agt1-T6 | start C4, start C3, end C3, end C4 |

Fig. 8A2

Branch definitions-subsystem2

| Last node of branch: | Branch: | Transaction: | Component invocations: |
|---|---|---|---|
| 0:0:0:0 | agt2-branch1 | agt2-T1 | start C5, start C6, end C6, end C5 |
| 0:0:1:0 | agt2-branch2 | agt2-T2 | start C5, start C7, end C7, end C5 |

Fig. 8A3

Branch definitions-manager

| Last node of branch: | Branch: | Transaction: | Component invocations: |
|---|---|---|---|
| 0:0:0:0:0:0:0:0 | mgr-branch1 | mgr-T1 | start C1, start C2, start C5, start C6, end C6, end C5, end C2, end C1 |
| 0:0:0:0:1:0:0:0:0 | mgr-branch2 | mgr-T2 | start C1, start C2, start C5, start C7, end C7, end C5, end C2, end C1 |
| 0:0:1:0:0 | mgr-branch3 | mgr-T3 | start C1, start C3, end C3, end C1 |
| 0:0:1:0:1:0:0 | mgr-branch4 | mgr-T4 | start C1, start C3, end C3, start C3, end C3, end C1 |
| 0:0:1:0:2:0:0 | mgr-branch5 | mgr-T5 | start C1, start C3, end C3, start C2, end C2, end C1 |
| 0:1:0:0 | mgr-branch6 | mgr-T6 | start C4, start C2, end C2, end C4 |
| 0:1:1:0:0 | mgr-branch7 | mgr-T7 | start C4, start C3, end C3, end C4 |

Fig. 8B1

References to static data-subsystem1

| Node: | static data: |
|---|---|
| 0:0 | static_data_C1 |
| 0:0:0 | static_data_C2 |
| 0:0:0:0 | static_data_C2 |
| 0:0:0:0:0 | static_data_C1 |
| | |
| 0:0:1 | static_data_C3 |
| 0:0:1:0 | static_data_C3 |
| 0:0:1:0:0 | static_data_C1 |
| | |
| 0:0:1:0:1 | static_data_C3 |
| 0:0:1:0:1:0 | static_data_C3 |
| 0:0:1:0:1:0:0 | static_data_C1 |
| | |
| 0:0:1:0:2 | static_data_C2 |
| 0:0:1:0:2:0 | static_data_C2 |
| 0:0:1:0:2:0:0 | static_data_C1 |
| | |
| 0:1 | static_data_C4 |
| 0:1:0 | static_data_C2 |
| 0:1:0:0 | static_data_C2 |
| 0:1:0:0:0 | static_data_C4 |
| | |
| 0:1:1 | static_data_C3 |
| 0:1:1:0 | static_data_C3 |
| 0:1:1:0:0 | static_data_C4 |

Fig. 8B2

References to static data-subsytsem2

| Node: | static data: |
|---|---|
| 0:0 | static_data_C5 |
| 0:0:0 | static_data_C6 |
| 0:0:0:0 | static_data_C6 |
| 0:0:0:0:0 | static_data_C5 |
| | |
| 0:0:1 | static_data_C7 |
| 0:0:1:0 | static_data_C7 |
| 0:0:1:0:0 | static_data_C5 |

Fig. 8B3

References to static data-subsystem1 for update:

| | |
|---|---|
| 0:0:2 | static_data_C8 |
| 0:0:2:0 | static_data_C8 |
| 0:0:2:0:0 | static_data_C1 |

Fig. 8B4

References to static data-manager

| Node: | static data: |
|---|---|
| 0:0 | static_data_C1 |
| 0:0:0 | static_data_C2 |
| 0:0:0:0 | static_data_C5 |
| 0:0:0:0:0 | static_data_C6 |
| 0:0:0:0:0:0 | static_data_C6 |
| 0:0:0:0:0:0:0 | static_data_C5 |
| 0:0:0:0:0:0:0:0 | static_data_C2 |
| 0:0:0:0:0:0:0:0:0 | static_data_C1 |
| 0:0:0:0:1 | static_data_C7 |
| 0:0:0:1:0 | static_data_C7 |
| 0:0:0:1:0:0 | static_data_C5 |
| 0:0:0:1:0:0:0 | static_data_C2 |
| 0:0:0:1:0:0:0:0 | static_data_C1 |
| 0:0:1 | static_data_C3 |
| 0:0:1:0 | static_data_C3 |
| 0:0:1:0:0 | static_data_C1 |

| Node: | static data: |
|---|---|
| 0:0:1:0:1 | static_data_C3 |
| 0:0:1:0:1:0 | static_data_C3 |
| 0:0:1:0:1:0:0 | static_data_C1 |
| 0:0:1:0:2 | static_data_C2 |
| 0:0:1:0:2:0 | static_data_C2 |
| 0:0:1:0:2:0:0 | static_data_C1 |

| Node: | static data: |
|---|---|
| 0:1 | static_data_C4 |
| 0:1:0 | static_data_C2 |
| 0:1:0:0 | static_data_C2 |
| 0:1:0:0:0 | static_data_C4 |
| 0:1:1 | static_data_C3 |
| 0:1:1:0 | static_data_C3 |
| 0:1:1:0:0 | static_data_C4 |

Fig. 8B5

References to static data-manager for update:

| Node: | static data: |
|---|---|
| 0:0:2 | static_data_C8 |
| 0:0:2:0 | static_data_C8 |
| 0:0:2:0:0 | static_data_C1 |

Fig. 8C

Dynamic data for example transaction-subsystem1

| Node: | Component: | start/end: | time: | Other dynamic data: |
|---|---|---|---|---|
| 0:0 | C1 | start | t1 | dynamic_data_1 (ex: parameter1 passed in a call) |
| 0:0:0 | C2 | start | t2 | dynamic_data_2 (ex: parameter2 passed in a call) |
| 0:0:0:0 | C2 | end | t3 | dynamic_data_3 (ex: parameter3 passed in a return) |
| 0:0:0:0:0 | C1 | end | t4 | dynamic_data_4 (ex: parameter4 passed in a return) |

Fig. 8D

Records of static data:

static_data_C1
static_data_C2
static_data_C3
static_data_C4
static_data_C5
static_data_C6
static_data_C7
static_data_C8

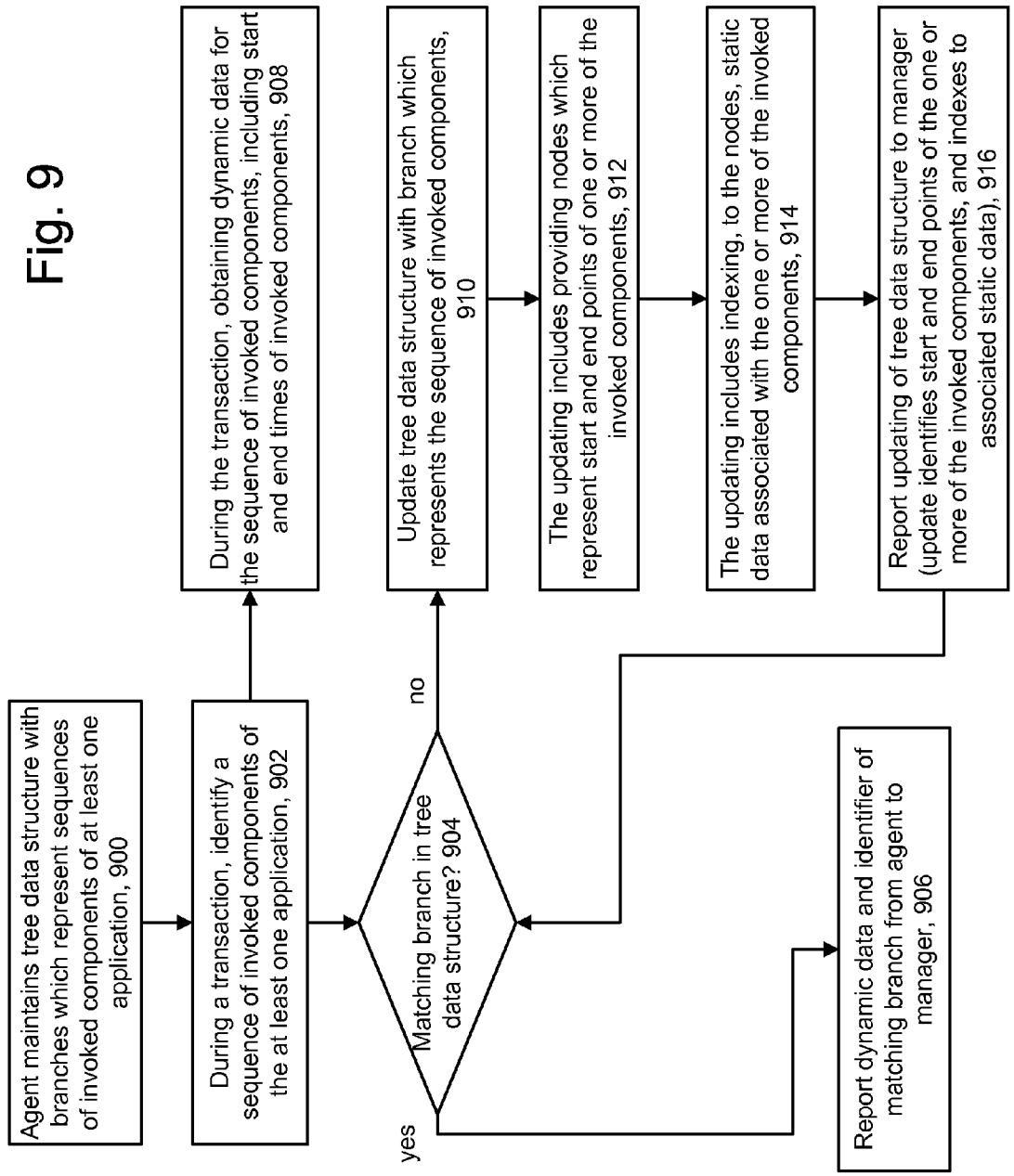

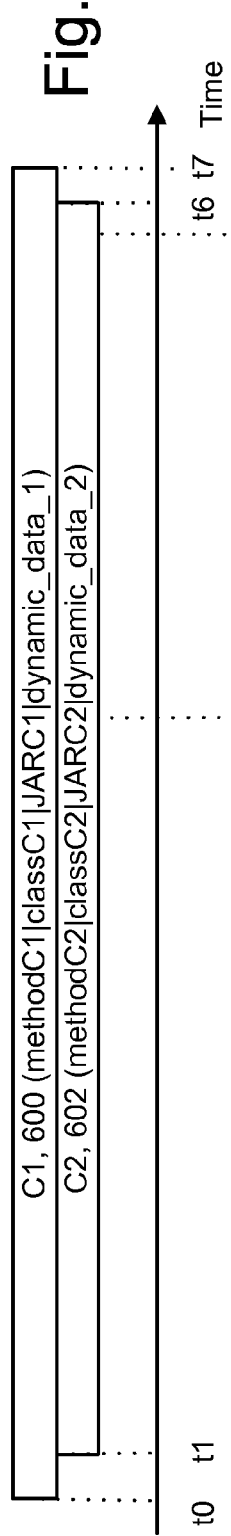
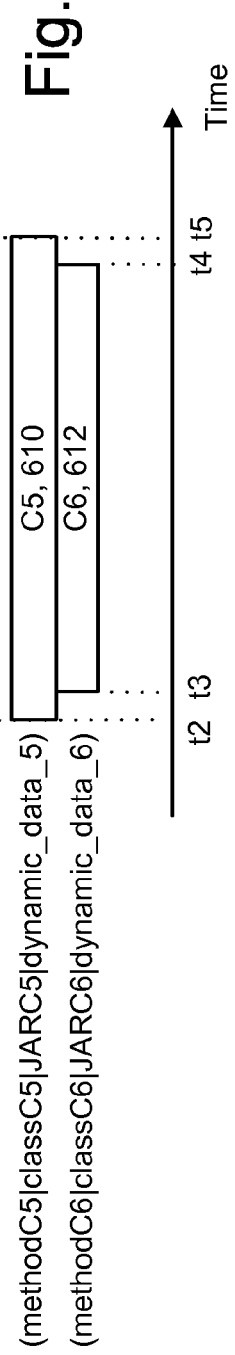
Fig. 11A
Fig. 11B

| Gatherer: | Node: | Component: | Transaction: |
|---|---|---|---|
| 1200 | 0:0:0:0 | C2 | agt1-T1 |
| 1202 | 0:0:1:0:2:0 | C2 | agt1-T4 |

Fig. 13A

| Gatherer: | Node: | Component: | Transaction: |
|---|---|---|---|
| 1204 | 0:0:0:0 | C2 | agt1-T1 |
| 1204 | 0:0:1:0:2:0 | C2 | agt1-T4 |

Fig. 13B

| Gatherer: | Node: | Component: | Transaction: |
|---|---|---|---|
| 1206 | 0:0:1:0 | C3 | agt1-T3 |
| 1206 | 0:0:1:0:1:0 | C3 | agt1-T3 |

Fig. 13C

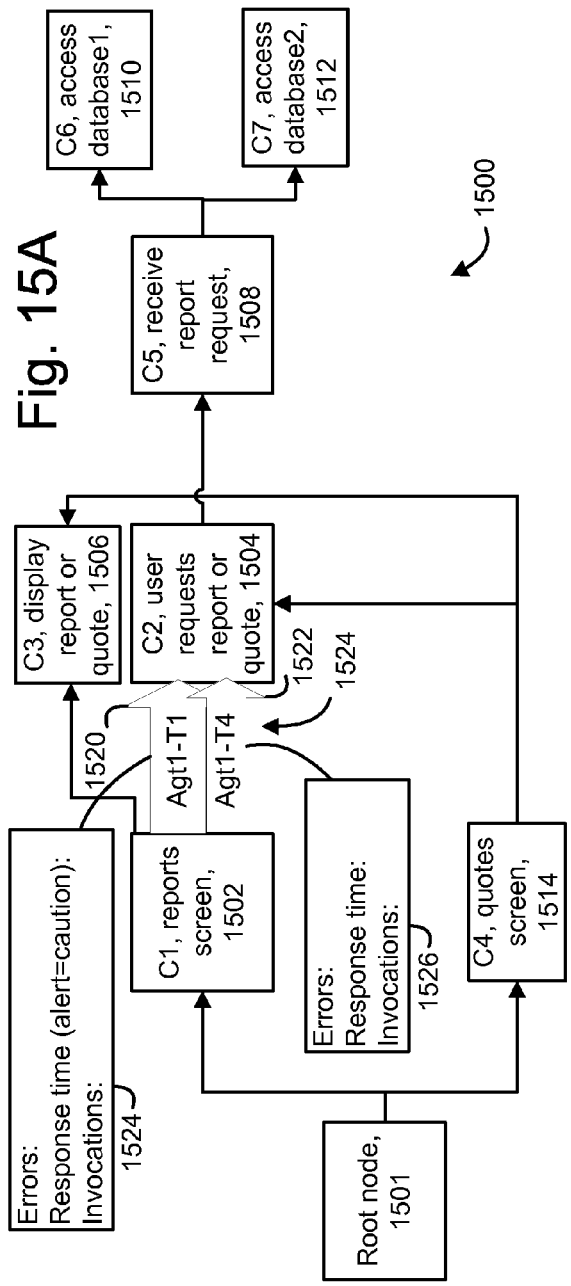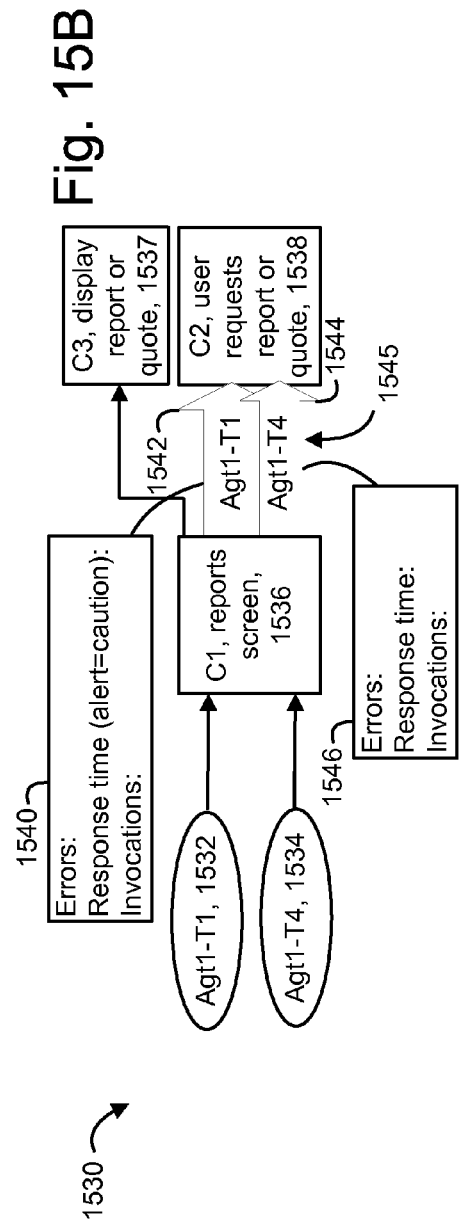

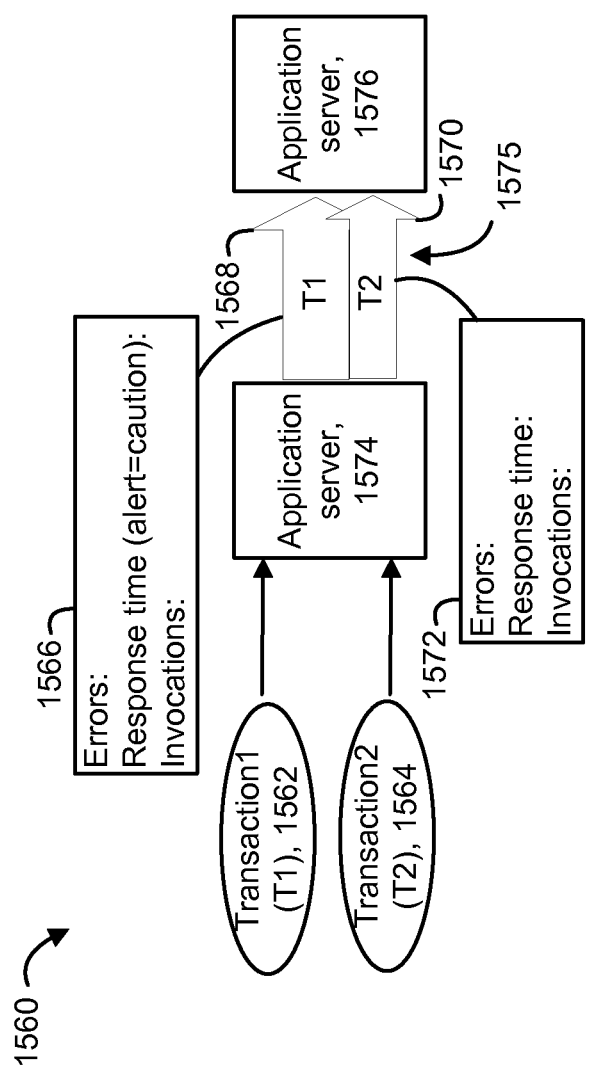

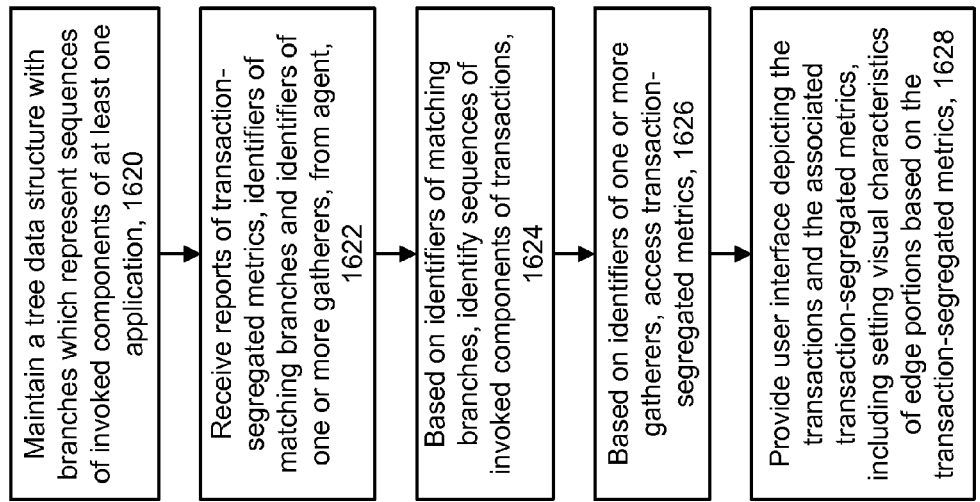
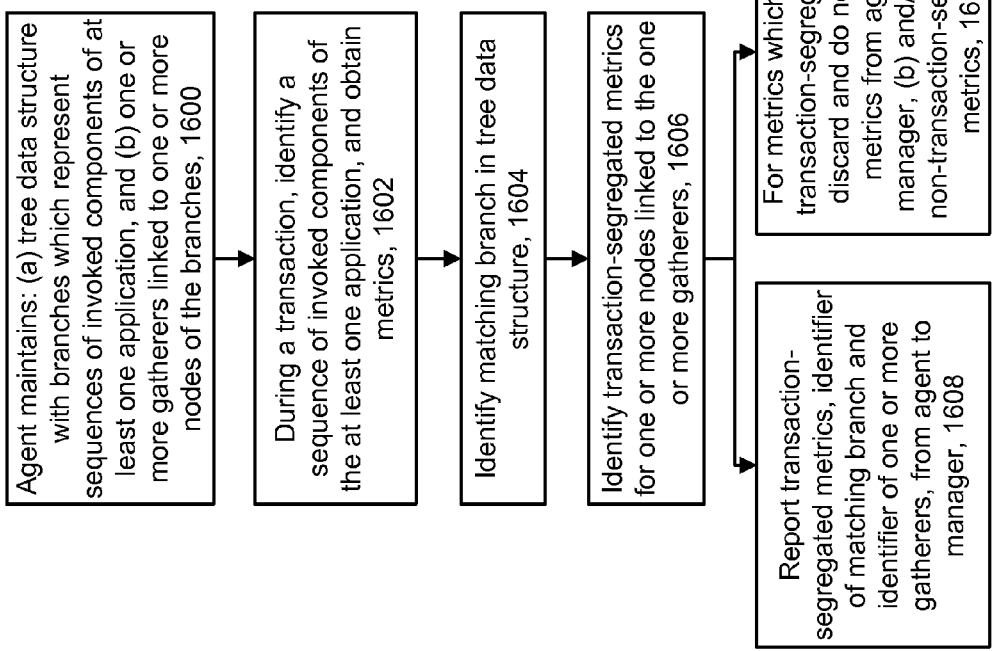

EFFICIENTLY COLLECTING TRANSACTION-SEPARATED METRICS IN A DISTRIBUTED ENVIROMENT

BACKGROUND OF THE INVENTION

1. Field of the Invention

Technology for monitoring software in a computing environment is provided.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the infrastructure of the application by collecting application runtime data regarding the individual software components that are invoked in the application. This approach can use agents that essentially live in the system being monitored. For example, using instrumentation of the software, a thread or process can be traced to identify each component that is invoked, as well as to obtain runtime data such as the execution time of each component. Tracing refers to obtaining a detailed record, or trace, of the steps a computer program executes. One type of trace is a stack trace. Traces can be used as an aid in debugging.

Typically, transaction trace data, including static and dynamic data, is communicated from the agent to a manager. However, existing approaches are inefficient and incur substantial overhead costs.

SUMMARY OF THE INVENTION

The present invention provides a technique for monitoring software which addresses the above and other issues.

In one embodiment, one or more tangible processor-readable storage devices having computer readable software embodied thereon are provided for programming at least one processor to perform a method for monitoring at least one application, The method includes: (a) providing a tree data structure having respective branches which represent respective transactions of the at least one application, and which include nodes which represent start and end points of components of the respective transactions, where one branch of the respective branches represents one transaction of the respective transactions, and includes, linked to a first gatherer, at least one node for one component, the at least one node for the one component in the one branch represents at least one of a start and an end of one invocation of the one component in the one transaction.

The method further includes: (b) tracing the at least one application to detect one sequence of invoked components, including detecting the at least one of the start and the end of the one invocation of the one component in the one transaction, (c) using the first gatherer to gather at least one metric of the one component in a context of the first gatherer when the tracing detects the at least one of the start and the end of the one invocation of the one component in the one transaction, (d) comparing a result of the tracing to the tree data structure to determine that the one sequence of invoked components is consistent with the one branch, and (e) responsive to the determining that the one sequence of invoked components is consistent with the one branch, reporting, to a manager, the at least one metric for the one component in the context of the first gatherer.

In another embodiment, one or more tangible processor-readable storage devices having computer readable software embodied thereon are provided for programming at least one processor to perform a method for managing at least one application. The method includes receiving one or more reports from at least one agent which traces respective transactions in the at least one application, where the one or more reports include at least one metric for at least one transaction of the respective transactions and an associated identification of a first gatherer, and at least one metric for at least another transaction of the respective transactions and an associated identification of a second gatherer, the first gatherer was used to gather the at least one metric for the at least one transaction responsive to component invocations in the at least one transaction, and the second gatherer was used to gather the at least one metric for the at least another transaction responsive to component invocations in the at least another transaction.

The method further includes providing a user interface based on the one or more reports, where the user interface comprises a directed graph having vertices connected by edges, including an edge having at least a first edge portion which represents the at least one transaction and a second edge portion which represents the at least another transaction, and the first edge portion is visually distinguished from the second edge portion.

In another embodiment, one or more tangible processor-readable storage devices having computer readable software embodied thereon are provided for programming at least one processor to perform a method for monitoring at least one application. The method includes: (a) tracing respective transactions of the at least one application, the tracing detects one instance of a component in at least one transaction and another instance of the component in at least another transaction, (b) determining that the one instance of the component was detected in a context of the at least one transaction, and, separately, that the another instance of the component was detected in a context of the at least another transaction, (c) responsive to the determining that the one instance of the component was detected in the context of the at least one transaction: reporting, to a manager, at least one metric of the one instance of the component in the context of the at least one transaction, and (d) responsive to the determining that the another instance of the one component was detected in the context of the at least another transaction: reporting, to the manager, at least one metric of the another instance of the component in the context of the at least another transaction, where the context of the at least one transaction is distinct from the context of the at least another transaction.

Corresponding processor-implemented methods may be provided which perform computer-implemented steps of the one or more tangible processor-readable storage devices.

Corresponding systems may be provided which include one or more tangible processor-readable storage devices and one or more processors for reading the one or more tangible processor-readable storage devices.

Corresponding tangible computer- or processor-readable storage devices may be provided which are encoded with processor-readable instructions which, when executed, perform methods steps as provided herein.

BRIEF DESCRIPTION OF THE DRAWINGS

FIG. 1A depicts an example system in which multiple instances of an application run on different servers, and agents of the servers report to a manager.

FIG. 2A is a flowchart describing one embodiment of a process for starting the tracing of a transaction.

FIG. 2B is a flowchart describing one embodiment of a process for concluding the tracing of a transaction.

FIG. 3 depicts a computing device of the network of FIG. 1A or 1B.

FIG. 4 depicts a hierarchy for use in describing the operation of one or more applications.

FIG. 5B depicts an alternative, more compact, view of the dependency relationships of FIG. 5A.

FIGS. 6A-6I depict transaction traces for different sequences of invoked components in the transactions of FIG. 5A.

FIG. 7A1 depicts an example of tree data structures of agent1 and agent2 which are provided based on the transaction traces of FIGS. 6A-6I.

FIG. 7A2 depicts an alternative and equivalent view of the tree data structure of FIG. 7A1.

FIG. 7C1 depicts a tree data structure of a manager which combines the tree data structures of agent1 and agent2 of FIG. 7A1.

FIG. 7C2 depicts a correspondence between a last node in the tree data structure of agent1 of FIG. 7A1 and a last node of the manager tree data structure of FIG. 7C1.

FIG. 8A1 depicts a record of branches and component invocations for subsystem1 in the tree data structure of FIG. 7A1.

FIG. 8A2 depicts a record of branches and component invocations for subsystem2 in the tree data structure of FIG. 7A1.

FIG. 8A3 depicts branch definitions at a manager.

FIG. 8B1 depicts a record of references to static data for different nodes/components of subsystem1 in the tree data structure of FIG. 7A1.

FIG. 8B2 depicts a record of references to static data for different nodes/components of subsystem2 in the tree data structure of FIG. 7A1.

FIG. 8B3 depicts an update to the record of FIG. 8B1 for agt1-new-branch in FIG. 7B.

FIG. 8B4 depicts a record of references to static data for different nodes/components of a manager in the tree data structure of FIG. 7C1.

FIG. 8B5 depicts an update to the record of FIG. 8B4 for mgr-new-branch7 in FIG. 7D.

FIG. 8C depicts a record of dynamic data from tracing details for different nodes/components of subsystem1 of the tree data structure of FIG. 7A1.

FIG. 8D depicts records of static data associated with different components.

FIG. 9 depicts an example process in which an agent maintains a tree data structure such as in FIG. 7A1 for at least one application.

FIG. 11A depicts the transaction trace of FIG. 6A with annotation using static and dynamic data.

FIG. 11B depicts the transaction trace of FIG. 6A with annotation using static and dynamic data.

FIG. 13A depicts a record of references to the gatherers 1200 and 1202 for the tree data structure of FIG. 12A.

FIG. 13B depicts a record of references to the gatherer 1204 for the tree data structure of FIG. 12B.

FIG. 13C depicts a record of references to the gatherer 1206 for the tree data structure of FIG. 12C.

FIG. 15A depicts an example user interface consistent with FIG. 5B and FIG. 14A.

FIG. 15B depicts an example user interface which is an alternative to FIG. 15A.

FIG. 15C depicts another example user interface.

FIG. 16A depicts an example process in which an agent obtains transaction-segregated metrics for at least one application.

FIG. 16B depicts an example process in which a manager provides a user interface based on a report of transaction-segregated metrics from an agent, in correspondence with the process of FIG. 16A.

DETAILED DESCRIPTION

Figure 1B:
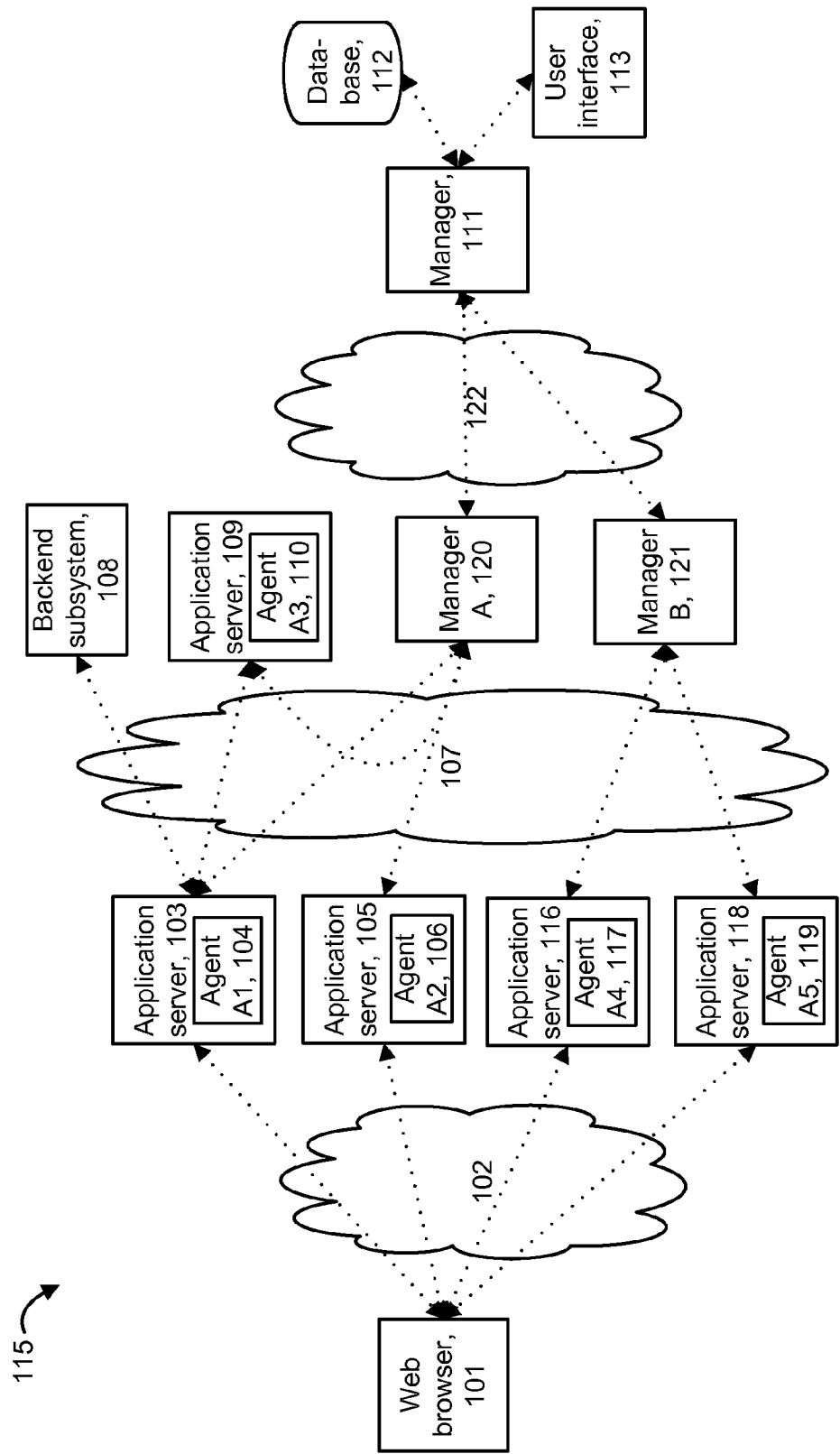
FIG. 1B depicts an example system in which multiple instances of an application run on different servers, and agents of the servers report to a manager via intermediate collectors.

The present invention provides a technique for monitoring software which efficiently communicates transaction trace data, including static and dynamic data, from an agent to a manager. To improve efficiency and reduce overhead costs, a tree data structure maintained by the agent and manager describes sequences of invoked components of the software. The start and end of each component is represented by a node in a branch of the tree data structure. To identify a transaction, the agent can communicate a unique identifier of the branch, such as an identifier of a last node of the branch. This allows the sequence of invoked components to be reported more efficiently from the agent to the manager. Further, static data can be indexed to one or more of the nodes or components, and accessed by the agent and/or manager. Static data typically is fixed for a given version of software, and can also be thought of as fixed or execution-independent data. The static data can include, e.g., a class name or method name associated with the component, a sequence of method calls, a name of an archive file (such as a JAVA Archive file or .JAR file or a Web Archive file or .WAR file) from which a traced class file is deployed, a text string, a component type (e.g., servlet, EJB), a port number for a servlet or a socket, a URL, a host name, and a local or remote interface name. These are all types of information which are available from tracing the software. The indexing of the static data avoids the need to repeatedly communicate the static data from the agent to the manager, and the need for the agent and/or manager to repeatedly obtain the static data.

Dynamic data can be obtained from a trace. Dynamic data can include start and end times of components, and other dynamic data such as a value of a parameter passed to or by a monitored method. The dynamic data can also be indexed to one or more nodes or components. The dynamic data could be indexed to the start and/or end nodes of a component. Through this indexing, the dynamic data can be reported efficiently from the agent to the manager.

When a transaction is traced, the agent can identify a matching branch in the tree data structure. If there is no match, the agent updates the tree data structure and reports the update to the manager, so that the agent and manager can maintain synchronized versions of the tree data structure. Further, the manager can maintain a tree data structure based on reports from multiple agents, where different portions of the tree data structure are associated with different agents. The manager can also pass on an update which is received from one agent to another agent, when the agents monitor different instances of the same software. In this way, new transactions can be propagated quickly among agents so that the tree data structures of the agents are synchronized.

FIG. 1A depicts an example system 100 in which multiple instances of an application run on different servers, and agents of the servers report to a manager. Example managed computing devices 103, 105 and 109 may include application servers or any other type of computing device having a processor for executing code to achieve a desired functionality. The managed computing devices can be located remotely from one another or co-located. The managed computing devices communicate with a manager computer 111 via a network 107 in this example. The manager computer 111 can be local to, or remote from, the managed computing devices. The managed computing devices 103 and 105 also communicate with client computing devices such as an example web browser 101 via a network 102. The web browser 101 may access the network 102 via an Internet Service Provider, for instance. Further, as an example, the managed computing device 103 calls the managed computing device 109, such as via a Web Services call or EJB Client, to obtain information which is needed to respond to a request from the web browser. The managed computing device 103 can also call a backend system 108 such as a mainframe, database or some other uninstrumented computing device, to obtain information which is needed to respond to a request from the web browser. While a full range of performance metrics can be obtained from a managed computing device due to the use of instrumentation, limited information may be obtained regarding an uninstrumented subsystem from the methods that are used to call out to them from the managed computing device. The managed computing devices are considered to be front end subsystems. The networks 102 and 107 can be the same, overlapping or distinct, and can include, e.g., the Internet, another wide area network, and/or a local area network. The dotted lines indicate communication paths.

For example, a corporation running an enterprise application such as a web-based e-commerce application may employ a number of application servers at one location for load balancing. Requests from users, such as from the example web browser 101, are received via the network 102, and can be routed to any of the managed computing devices 103 and 105. Agent software running on the managed computing devices 103, 105 and 109, denoted by Agent A1 (104), Agent A2 (106) and Agent A3 (110), respectively, gather information from an application, middleware or other software, running on the respective managed computing devices. Such information may be obtained using instrumentation, one example of which is byte code instrumentation. However, the gathered data may be obtained in other ways as well. The agents essentially live in the computing device being monitored and provide a data acquisition point. The agents organize and optimize the data communicated to the manager 124. In one implementation, different instances of the same application run at the managed computing devices 103 and 105, while another application runs at the managed computing device 109.

The manager 111 can be provided on a separate computing device such as a workstation which communicates with a user interface 113, such as a monitor, to display information based on data received from the agents. The manager can also access a database 112 to store the data received from the agents. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 111 and user interface display 113 might be provided at a corporate headquarters location. Other applications which are not necessarily web-based or involve retail or other sales, similarly employ agents and managers for managing their systems. For example, a bank may use an application for processing checks and credit accounts. Moreover, in addition to the multi-computing device arrangements mentioned, a single computing device can be monitored as well with one or more agents.

Various approaches are known for instrumenting software to monitor its execution. For example, as mentioned at the outset, tracing may be used to track the execution of software. One example of tracing is discussed in U.S. Pat. No. 7,870,431, issued Jan. 11, 2011, titled "Transaction Tracer," and incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it is referred to as a managed application, and a computing device on which the application runs is referred to as a managed computing device. The agent software receives information from the probes and may communicate the information to another process, such as at the manager 111, or process the information locally, such as to determine whether the information indicates an abnormal condition. The agent thus collects and summarizes information received from the probes. The probes collect information as defined by a directives file. For example, the information from the probes may indicate start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents are typically aware of the software executing on the local managed computing device with which they are associated.

The probes can report a standard set of metrics which include: CORBA method timers, Remote Method Invocation (RMI) method timers, Thread counters, Network bandwidth, JDBC update and query timers, Servlet timers, Java Server Pages (JSP) timers, System logs, File system input and output bandwidth meters, Available and used memory and EJB (Enterprise JavaBean) timers. A metric is a measurement of a specific application activity.

An agent reports information about transactions, which identifies resources which are accessed by an application. In one approach, when reporting about transactions, the word Called designates a resource. This resource is a resource (or a sub-resource) of a parent component, which is a consumer. For example, assume that Servlet A is the first component invoked in a transaction. Under the consumer Servlet A (see below), there may be a sub-resource Called EJB. Consumers and resources can be reported by the agent in a tree-like manner. Data for a transaction can also be stored according to the tree. For example, if a Servlet (e.g. Servlet A) is a consumer of a network socket (e.g. Socket C) and is also a consumer of an EJB (e.g. EJB B), which in turn is a consumer of a JDBC (e.g. JDBC D), the tree might look something like the following:

---

Servlet A
    Data for Servlet A
    Called EJB B
        Data for EJB B
        Called JDBC D
            Data for JDBC D
    Called Socket C
        Data for Socket C

---

In one embodiment, the above tree is stored by the Agent in a stack, called the Blame Stack. When transactions are started, they are pushed onto the stack. When transactions are completed, they are popped off the stack. In one embodiment, each transaction on the stack has the following information stored: type of transaction, a name used by the system for that transaction, a hash map or dictionary of parameters, a timestamp for when the transaction was pushed onto the stack, and sub-elements. Sub-elements are Blame Stack entries for other components (e.g. methods, process, procedure, function, thread, set of instructions, etc.) that are started from within the transaction of interest. Using the tree as an example above, the Blame Stack entry for Servlet A would have two sub-elements. The first sub-element would be an entry for EJB B and the second sub-element would be an entry for Socket Space C. Even though a sub-element is part of an entry for a particular transaction, the sub-element will also have its own Blame Stack entry. An example of an entry point to a transaction/branch is a URL. As the tree above notes, EJB B is a sub-element of Servlet A and also has its own entry. The top (or initial) entry (e.g., Servlet A) for a transaction, is called the root component. Each of the entries on the stack is an object.

FIG. 1B depicts an example system 115 in which multiple instances of an application run on different servers, and agents of the servers report to a manager via intermediate managers. In this example, additional managed computing devices 116 and 118 with agent A4 117 and agent A5 119, respectively, are provided. Further, intermediate, or low level, manager computing devices 120 (manager A) and 121 (manager B) are provided which receive data from agent A4 and agent A5, respectively. The intermediate managers in turn report the data to the manager 111 which, in this case, is a high level manager, via a network 122. Networks 102, 107 and 122 can be the same, overlapping or distinct.

FIG. 2A is a flowchart describing one embodiment of a process for starting the tracing of a transaction. The steps are performed by the appropriate Agent(s). In step 130, a transaction starts. In one embodiment, the process is triggered by the start of a method (e.g., the calling of a "loadTracer" method). In step 132, the Agent acquires the desired parameter information. In one embodiment, a user can configure which parameter information is to be acquired via a configuration file or a UI. The acquired parameters are stored in a hash map or dictionary, which is part of the object pushed onto the Blame Stack. In other embodiments, the identification of parameters is pre-configured. There are many different parameters that can be stored. In one embodiment, the actual list of parameters used is dependent on the application being monitored. The table below provides examples of some parameters that can be acquired.

| Parameters | Appears in | Value |
| --- | --- | --- |
| UserID | Servlet, JSP | The UserID of the end-user invoking the http servlet request. |
| URL | Servlet, JSP | The URL passed through to the servlet or JSP, not including the Query String. |
| URL Query | Servlet, JSP | The portion of the URL that specifies query parameters in the http request (text that follows the '?' delimiter). |
| Dynamic SQL | Dynamic JDBC Statements | The dynamic SQL statement, either in a generalized form or with all the specific parameters from the current invocation. |
| Method | Blamed Method timers (everything but Servlets, JSP's and JDBC Statements) | The name of the traced method. If the traced method directly calls another method within the same component, only the "outermost" first encountered method is captured. |
| Callable SQL | Callable JDBC statements | The callable SQL statement, either in a generalized form or with all the specific parameters from the current invocation. |
| Prepared SQL | Prepared JDBC statements | The prepared SQL statement, either in a generalized form or with all the specific parameters from the current invocation. |
| Object | All non-static methods | toString( ) of the this object of the traced component, truncated to some upper limit of characters. |
| Class Name | All | Fully qualified name of the class of the traced component. |
| Param_n | All objects with WithParams custom tracers | toString( ) of the nth parameter passed to the traced method of the component. |
| Primary Key | Entity Beans | toString( ) of the entity bean's property key, truncated to some upper limit of characters. |

Parameters can include query, cookie, post, URL and session type name/value pairs.

In step 134, the system acquires a timestamp indicating the current time. In step 136, a stack entry is created. In step 138, the stack entry is pushed onto the Blame Stack. In one embodiment, the timestamp is added as part of step 138. The process is performed when a transaction is started. A similar process is performed when a sub-component of the transaction starts (e.g., EJB B is a sub-component of Servlet A—see tree described above).

FIG. 2B is a flowchart describing one embodiment of a process for concluding the tracing of a transaction. The process is performed by an Agent when a transaction ends. In step 140, the process is triggered by a transaction (e.g., method) ending (e.g., calling of a method "finishTrace"). In step 142, the system acquires the current time. In step 144, the stack entry is removed. In step 146, the execution time of the transaction is calculated by comparing the timestamp from step 142 to the timestamp stored in the stack entry. In step 148, the filter for the trace is applied. For example, the filter may include a threshold period of one second. Thus, step 148, would include determining whether the calculated duration from step 146 is greater than one second. If the threshold is not exceeded (step 150), then the data for the transaction is discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the Agent to other components in the system of FIG. 1A or 1B. If the duration exceeds the threshold (step 150), then the Agent builds component data in step 160. Component data is the data about a transaction that will be reported. In one embodiment, the component data includes the name of the transaction, the type of the transaction, the start time of the transaction, the duration of the transaction, a hash map or dictionary of the parameters, and all of the sub-elements (which can be a recursive list of elements). Other information can also be part of the component data. In step 162, the Agent reports the component data by sending the component data via the TCP/IP protocol to the manager 111.

FIG. 2B represents what happens when a transaction finishes. When a sub-component finishes, however, the steps performed include getting a time stamp, removing the stack entry for the sub-component and adding the completed sub-element to previous stack entry. In one embodiment, the filters and decision logic are applied to the start and end of the transaction, rather than to a specific sub-component.

Note, in one embodiment, if the transaction tracer is off, the system will still use the Blame Stack; however, parameters will not be stored and no component data will be created. In some embodiments, the system defaults to starting with the tracing technology off. The tracing only starts after a user requests it, as described above.

FIG. 3 depicts a computing device of the network of FIG. 1A or 1B. The computing device 300 is a simplified representation of a system which might be used as one of the web browsers, application server, managers and/or user interfaces, such as discussed in connection with FIG. 1A or 1B. The computing device 300 includes a storage device 310 such as a hard disk or portable media, a network interface 320 for communicating with other computing devices, a processor 330 for executing software instructions, a working memory 340 such as RAM for storing the software instructions after they are loaded from the storage device 310, for instance, and a user interface display 350 such as one or more video monitors. A user interface can be provided one or more monitors. The storage device 310 may be considered to be a tangible, non-transitory processor- or computer-readable storage device having processor readable code embodied thereon for programming the processor 330 to perform methods for providing the functionality discussed herein. The user interface display 350 can provide information to a human operator based on the data received from one or more agents. The user interface display 350 can use any known display scheme, whether graphical, tabular or the like. In addition to an on-screen display, an output such as a hard copy such from a printer can be provided.

A database may be included in the storage device 310 when the storage device 310 is part of a computing device 300 such as an application server, manager and/or user interfaces. The storage device 310 can represent one or more storage devices which store data received from one or more agents, and which can be accessed to obtain data to provide a user interface as described herein. The storage device 310 can represent a data store.

Further, the functionality described herein may be implemented using hardware, software or a combination of both hardware and software. For software, one or more non-transitory, tangible processor readable storage devices having processor readable code embodied thereon for programming one or more processors may be used. The non-transitory, tangible processor readable storage devices can include computer readable media such as volatile and nonvolatile media, removable and non-removable media. For example, non-transitory, tangible computer readable media may include volatile and nonvolatile, removable and non-removable media implemented in any method or technology for storage of information such as computer readable instructions, data structures, program modules or other data. Examples of non-transitory, tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more tangible computer readable media/storage devices, peripherals and/or communication interfaces.

FIG. 4 depicts a hierarchy for use in describing the operation of one or more applications. The different levels of the hierarchy can be defined based on any desired organizational structure. For example, the hierarchy can include human-facing terminology, that is, terminology which facilitates understanding of client's interactions with a monitored application. A hierarchy may encompass any type of interaction with an application, whether the interaction is in the realm of a for-profit business, such as for e-commerce transactions, educational organization or government organization, for instance. Further, the one or more hierarchies can include nodes at different levels of the one or more hierarchies, where each node has a descriptive name. The hierarchy can be considered to be an abstract construct which provides a way to organize information about how an application executes in a manner which is more understandable to the human operator.

A top level of the hierarchy is a domain level 400 named "Domain." A next level of the hierarchy is a Business Service level 402. An example of a Business Service relates to trading a stock using a web site. Thus, "Trading" can be the name of a node at the Business Service level of the hierarchy. A next level of the hierarchy is a Business Transaction level. A Business Service can be made up of a number of Business Transactions. For example, for Trading, the Business Transactions can include Reports 404 (e.g., view a report regarding a stock or an account) and Quotes 406 (e.g., obtain a quote for a stock price). Further, a Business Transaction can be associated with one or more Business Transaction Components. In one approach, a Business Transaction has only one identifying component. A Business Transaction Component can be a type of component of an application which is recognizable and measurable by a server, such as a servlet or EJB. In one approach, one of the components of an application is set as a Business Transaction Component, which is an identifying transaction component for a Business Transaction.

The Business Transaction Component is the identifying transaction component for the transaction that is the identifying transaction for the Business Transaction. A transaction can represent a sequence of software components which are invoked in response to a request from a client, to provide a corresponding response to the client. For example, a Business Transaction Component can be identified by determining when component data reported by an agent match a set of rules. This definition can include, e.g., a specified URL host name, URL parameters, HTTP post parameters, cookie and/or session manager parameters. Additionally, or alternatively, the definition may require a transaction to start with a specified URL host name. The agent or manager, for instance, can compare the component data against the set of rules to determine when a Business Transaction Component is present in a Business Transaction. If a Business Transaction Component is detected, then the associated Business Transaction is of a specified type. For example, if the Business Transaction Component 408 is detected, then the associated Business Transaction is Reports 404. If the Business Transaction Component 410 is detected, then the associated Business Transaction is Quotes 406.

Figure 5A:
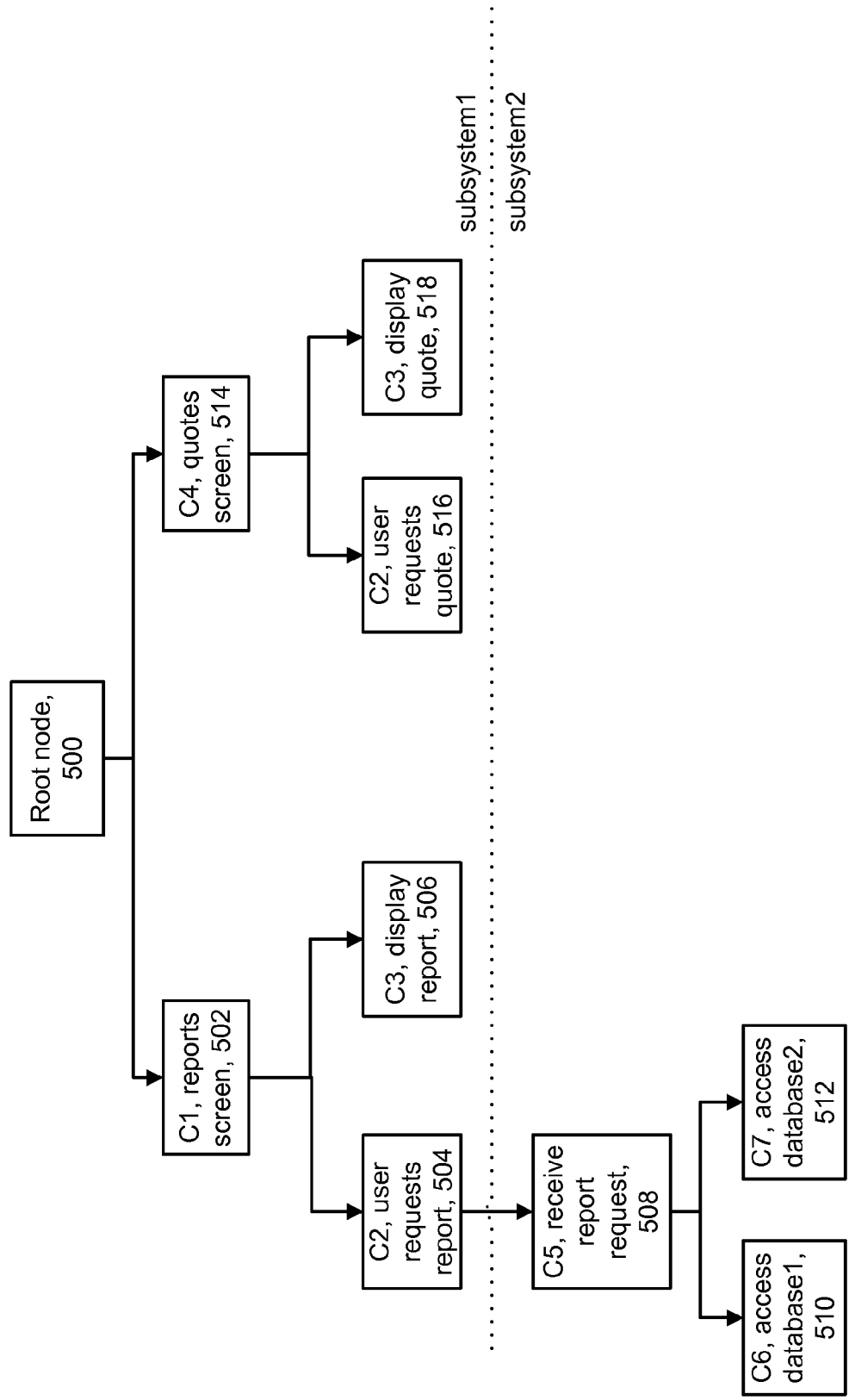
FIG. 5A depicts dependency relationships in an example sequence of components invoked in the Reports and Quotes Business Transactions of FIG. 4.

FIG. 5A depicts dependency relationships in an example sequence of components invoked in the Reports and Quotes Business Transactions of FIG. 4. The components are depicted as blocks in a flow path. The same component can appear more than once. Moreover, the components execute in different subsystems, namely subsystem1 (components above the dotted line) or subsystem2 (components below the dotted line).

Component-oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. One example of a component oriented programming model is J2EE, which can employ components such as a Java Server Page, an Enterprise Java Bean (EJB), a servlet, and a Java Database Connectivity (JDBC) component. JDBC is an Application Programming Interface (API) for the JAVA™ programming language that defines how a client may access a database. It provides methods for querying and updating data in a database. However, other component oriented programming models such as .NET may also be used. Moreover, the programming model need not be object oriented.

This example provides details of the Reports and Quotes Business Transactions discussed previously. In one possible implementation, each component of a Business Transaction includes one or more class-method pairs. For example, a servlet is a JAVA class. It is an object that receives a request and generates a corresponding response. A class-method pair can be represented by the notation class.method. For example, Reports could include a component C1 (502) which displays a reports screen on a user interface (UI) to receive a user's input regarding a desired report. An example format of a class-method pair for C1 is ServletA1.DisplayReportScreen. C1 is under a root 500. Thus, whenever an agent detects that C1 has been invoked, it concludes that the current transaction is part of Reports, and associates its component data with Reports.

C1 can call C2 (504) which relates to a requested report. C2 could include a class-method pair such as ServletA2.RequestedReport which processes a user input of a requested report. This processing could include checking the format of the request, for instance, and, if the format is valid, making a call to a component C5 (508) in subsystem2, which receives the report request. For instance, this call may be a cross-process, cross-thread transaction or cross-subsystem call. If the format is invalid, the control flow returns to C1, which may call C3 to display an error message, for instance.

An example format of a class-method pair for C5 is ServletA3.ReceiveReportRequest. C5 can call C6 (510) to access a database1 and/or C7 (512) to access a database2, such as based on the type of the report request. For example, C6 and C7 can each include a JDBC driver call which invokes one or more SQL statements. The control flow then returns to C5, then to C2 and then to C1. Subsequently, C1 calls C3 (506) which relates to providing a display, such as a display of the requested report based on data retrieved from the databases. The control flow then returns to C1.

C1 could call C3 additional times such as to adjust the display, e.g., based on a user command to display (e.g., re-display) the report data differently (over a different time period, and so forth).

Also, under the root 500, a component C4 (514) can be provided which displays a quotes screen on a user interface (UI) to receive a user's input regarding a desired quote. C1 can call C2 (504) which relates to a requested report. C2 can process the user input by checking the format of the request, for instance, and if the format is valid, obtaining the requested quote, such as from a data source which is local to subsystem1. If the format is invalid, the control flow returns to C4, which may call C3 to display an error message, for instance.

The control flow then returns to C4. C4 can call C3 (518), which relates to providing a display, such as a display of the requested quote based on the data retrieved from the data source. C4 could call C3 additional times such as to adjust the display, e.g., based on a user command to display (e.g., re-display) the quote data differently (over a different time period, with different moving averages, and so forth).

Note that a component can continue executing after calling another component, which begins executing, in an asynchronous, multi-thread or multi-process mode. Or, a component can temporarily pause until the called component has finished executing, in a synchronous, single-thread or single-process mode. A component which is pausing can be considered to be in a wait interval, while a component which is executing can be considered to be in an active, executing mode. Also, a component may be invoked more than once during a transaction.

FIG. 5B depicts an alternative, more compact, view of the dependency relationships of FIG. 5A. Node 505 combines nodes 504 and 516, and node 507 combines nodes 506 and 518.

FIGS. 6A-6I depict transaction traces for different sequences of invoked components in the transactions of FIG. 5A. The horizontal direction represents time, while the vertical direction indicates call stack depth or position. A transaction trace, also referred to as a call stack, identifies instrumented components which have been called or invoked during the execution of one or more programs, processes or threads. Trace data of instrumented components can be used along with dependency data to understand and debug an application. A transaction trace can be a trace or all or a portion of a transaction and can extend over one or more computing devices having respective agents. In particular, a separate transaction trace can be provided for each agent, such that different threads are separated out into different transaction traces. The transaction trace can be provided by a graphical representation on a user interface display.

The transaction trace of FIG. 6A corresponds to blocks 502 and 504 of FIG. 5A. A graph portion 600 represents C1, and a graph portion 602 represents C2. C1 starts executing at t0 and ends or stops at t7. C2, which is called by C1, starts executing at t1 and ends at t6.

The transaction trace of FIG. 6B is time-aligned with the transaction trace of FIG. 6A, and corresponds to blocks 508 and 510 of FIG. 5A. A graph portion 610 represents C5, and a graph portion 612 represents C2. C5 starts executing at t2 and ends at t5. C6, which is called by C5, starts executing at t2 and ends at t4.

The transaction trace of FIG. 6C is time-aligned with the transaction trace of FIG. 6A, and corresponds to blocks 508 and 512 of FIG. 5A. A graph portion 620 represents C5, and a graph portion 622 represents C7. C5 starts executing at t2 and ends at t5. C7, which is called by C5, starts executing at t2 and ends at t4. The transaction trace of FIG. 6C could be an alternative to the transaction trace of FIG. 6B if database2 was called instead of database1, for example. The time points t2-t5 are not necessarily the same as in FIG. 6B. Moreover, the time points t0, t1, t2, etc. generally do not necessarily represent equal time increments.

The transaction trace of FIG. 6D corresponds to blocks 502 and 504 of FIG. 5A. A graph portion 630 represents C1, and a graph portion 632 represents C2. C1 starts executing at t0 and ends at t3. C2, which is called by C1, starts executing at t1 and ends at t2. This transaction trace could represent the case where C1 calls C2 and C2 determines that the format of the user request is invalid, so that the control flow returns directly to C1.

The transaction trace of FIG. 6E corresponds to blocks 502 and 506 of FIG. 5A. A graph portion 640 represents C1, and a graph portion 642 represents C3. C1 starts executing at t0 and ends at t3. C3, which is called by C1, starts executing at t1 and ends at t2. This transaction trace could represent the case where C1 calls C3 and C3 displays or re-displays a report.

The transaction trace of FIG. 6F corresponds to blocks 502 and 506 of FIG. 5A. A graph portion 650 represents C1, and graph portions 652 and 654 represent separate invocations of C3. C1 starts executing at t0 and ends at t5. C3, when called by C1 a first time, starts executing at t1 and ends at t2. C3, when called by C1 a second time, starts executing at t3 and ends at t4. This transaction trace could represent the case where C1 calls C3 a first time to display a report, and a second time to re-display a report.

The transaction trace of FIG. 6G corresponds to blocks 502, 504 and 506 of FIG. 5A. A graph portion 660 represents C1, a graph portion 662 represent C3, and a graph portion 664 represents C2. C1 starts executing at t0 and ends at t5. C3, when called by C1, starts executing at t1 and ends at t2. C2, when called by C1, starts executing at t3 and ends at t4. This transaction trace could represent the case where C1 calls C3 to display a report, and the user make another request for a report, but the request is in an invalid format so that the control flow returns directly from C2 to C1.

The transaction trace of FIG. 6H corresponds to blocks 514 and 516 of FIG. 5A. A graph portion 670 represents C4, and a graph portion 672 represents C2. C4 starts executing at t0 and ends at t3. C2, which is called by C1, starts executing at t1 and ends at t2. This transaction trace could represent the case where C4 calls C2 with a user request for a quote.

The transaction trace of FIG. 6I corresponds to blocks 514 and 518 of FIG. 5A. A graph portion 680 represents C4, and a graph portion 682 represents C3. C4 starts executing at t0 and ends at t3. C3, which is called by C1, starts executing at t1 and ends at t2. This transaction trace could represent the case where C4 calls C3 and C3 displays a quote.

FIG. 7A1 depicts an example of tree data structures of agent1 and agent2 which are provided based on the transaction traces of FIGS. 6A-6I. A tree data structure can be represented by a directed graph or distributed tree which includes nodes and arrows or edges connecting the nodes. Each different path through the tree can be considered to represent a branch of the tree. Each respective branch represents a respective transaction or sequence of invoked components of at least one application. Moreover, each node represents the start or end of the execution of a component. Each node can also include a unique identifier. And, the identifier of a last node in a branch can serve as a unique identifier of the branch (e.g., unique within a subsystem/agent). That is, given the identifier of a last node in a branch, we can work back to each preceding node in the branch, to the first, root node of the branch. A branch of the tree can represent a component sequence or transaction which extends across multiple subsystems as well. For example, a branch portion above the dotted line includes nodes for components which execute in subsystem1, and a branch portion below the dotted line includes nodes for components which execute in subsystem2. Multiple branches can overlap, at least in part, so that they have some nodes in common. Typically, at least the root node is common to multiple branches.

An agent which monitors an application or other software can maintain an associated tree data structure. For example, an agent1 (agt1) at a subsystem1 can maintain the tree data structure which begins at root node 700, and an agent2 (agt2) at a subsystem2 can maintain the tree data structure which begins at root node 742. A manager can maintain a tree data structure which is based on the tree data structure of one or more agents. For example, a manager can maintain the tree data structure of FIG. 7C1, which combines the tree data structures of agent1 and agent2.

A root node 700 is a starting node for all branches in subsystem1. A first branch (agt1-branch1, representing a transaction agt1-T1) includes nodes 702, 704, 706 and 708. A second branch (agt1-branch2, representing a transaction agt1-T2) includes nodes 702, 710, 712 and 714. A third branch (agt1-branch3, representing a transaction agt1-T3) includes nodes 702, 710, 712, 716, 718 and 720. A fourth branch (agt1-branch4, representing a transaction agt1-T4) includes nodes 702, 710, 712, 722, 724 and 726. A fifth branch (agt1-branch5, representing a transaction agt1-T5) includes nodes 728, 730, 732 and 734. A sixth branch (agt1-branch6, representing a transaction agt1-T6) includes nodes 728, 736, 738 and 740.

A root node 742 is a starting node for all branches in subsystem2. A first branch (agt2-branch1, representing a transaction agt2-T1) includes nodes 744, 746, 748 and 750. A second branch (agt2-branch2, representing a transaction agt2-T2) includes nodes 744, 752, 754 and 756.

An identifier of each node can indicate a sequential position of the node within a branch, e.g., based on a number of values in the identifier. For example, node 702 has the identifier "0:0." This identifier has two values, separate by a colon, indicating that it is the second node in the branch, after the root node (having the identifier "0"). In the second, third and fourth branches, nodes 702, 710 and 712 (the second, third and fourth nodes) are common. In the second branch, the last node 714 has the identifier 0:0:1:0:0. In the third branch, the last node 716 has the identifier 0:0:1:0:1. In the fourth branch, the last node 722 has the identifier 0:0:1:0:2. Various other node identification schemes/code words could be used as well.

The node identifiers can be assigned independently, and therefore potentially repeated, in the different subsystems. However, the combination of a subsystem identifier (e.g., agent identifier) and a node identifier will be unique.

The tree data structure can be provided in different ways. In one approach, an agent of the subsystem builds the tree data structure over time as additional transactions are traced. Each transaction trace, e.g., sequence of invoked components, is compared to the branches of the tree to determine if there is a match. If there is a match, the transaction is already represented by the tree. However, if there is no match, the transaction is not already represented by the tree, and the tree data structure can be updated to represent the new transaction. The updating can involve adding a new branch which may or may not overlap, in part, with an existing branch. The new branch is provided by adding additional nodes which represent the start and end of invoked components of the new transaction. The additional nodes can represent another instance of the start and end of an invoked component which is already present in the tree data structure. For example, in agt1-branch3, nodes 710 and 712 represent the start and end of one instance of C3, and nodes 716 and 718 represent the start and end of another instance of C3.

An example of a branch of the tree that extends across multiple subsystems combines agt1-branch1 of subsystem1 and agt2-branch1 or agt2-branch2 of subsystem2, and is shown in FIG. 7C1. For example, node 742 in branch1 of subsystem2 follows node 704 in branch1 of subsystem1, and returns to node 706 in branch1. Or, node 742 in branch2 of subsystem2 could follow node 704 in branch1 of subsystem1, and return to node 706 in branch1. In either case, at least one component, e.g., C2, in the first subsystem calls at least one component, e.g., C5, in the second subsystem.

Each agent at a server and a manager can maintain separate tree data structures which correspond to one another. Ideally, the tree data structures are synchronized, at least in part, so that they represent the same set of transactions of at least one application or other software. As mentioned, when the agent detects a new transaction, it can update its tree data structure and report the update to the manager. The manager, in turn, can update its tree data structure. Moreover, there may be other agents which monitor other instances of the at least one application, and it is desirable for them to receive the updates as well to update their respective tree data structures. In one approach, the agent which detects a new transaction can provide the update directly to the other agents. In another approach, the agent reports the update to the manager, and the manager relays the updates to the other agents. This approach is efficient since the manager knows which other agents are reporting to the manager and can communicate the updates to them. The updates can be provided in any format. Updates sent from an agent to a manager may be communicated with dynamic data or separately.

By having the agent and manager maintain corresponding tree data structures, many efficiencies can be achieved. For example, static data which is associated with a transaction, and with components of the transaction, can be indexed to nodes of the tree and thereby made available to the manager by merely identifying a branch in the tree. The static data need not be repeatedly communicated by the agent to the manager. Static data generally does not change for a given version of the application or other monitored software. Thus, the same static data can be associated with multiple invocations of a given transaction or component. In contrast, dynamic data such as the start and end times of components, and other dynamic data such as a value of a parameter passed to a method, is not fixed, and can change for each traced transaction and for each invocation of a given component. Dynamic data as gathered by the agent can be reported from the agent to the manager. However, efficiencies can still be achieved by indexing the dynamic data to the nodes to readily identify the invoked components to which the dynamic data applies. Various data structures which can be used to achieve these efficiencies are described in connection with FIGS. 8A1-8C.

FIG. 7A2 depicts an alternative and equivalent view of the tree data structure of FIG. 7A1. Here, nodes 711 and 717 are the same as node 710, and nodes 713 and 719 are the same as node 712 having the same respective node identifiers. In this view, agt1-branch2 includes nodes 710, 712 and 714, agt1-branch3 includes nodes 711, 713, 715, 718 and 720 and agt1-branch4 includes nodes 717, 719, 721, 724 and 726. This view clarifies that node 714 is not part of agt1-branch3 and agt1-branch4.

Figure 7B:
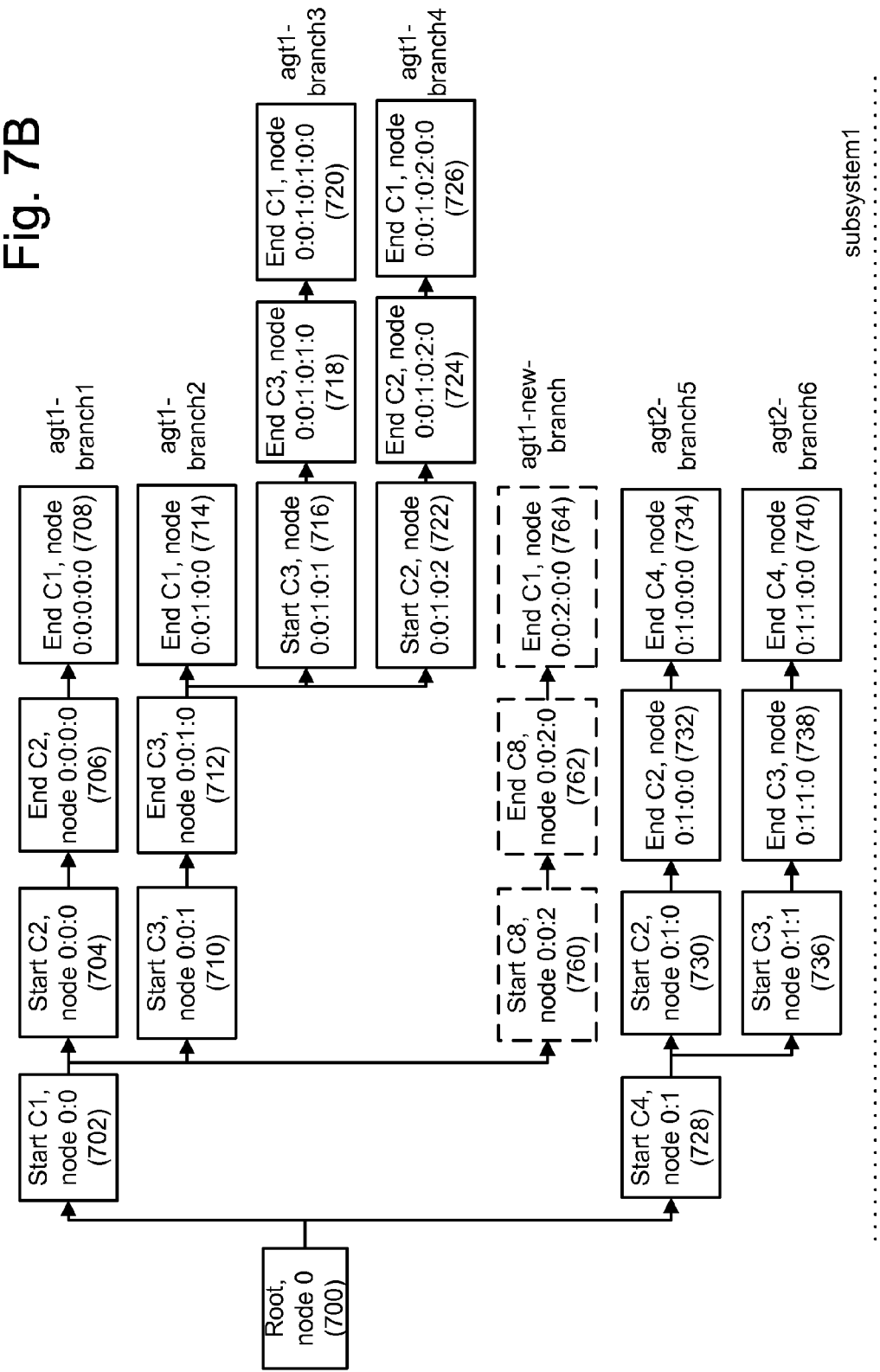
FIG. 7B depicts an update to the tree data structure of agent1 of FIG. 7A1 in the form of a new branch.

FIG. 7B depicts an update to the tree data structure of agent1 of FIG. 7A1 in the form of a new branch. For clarity, subsystem2 is not depicted. Agt1-new-branch, representing a transaction agt1-Tnew, is a new branch which is added to update the tree data structure of agent1, as discussed further below in connection with the process of FIG. 9. Agt1-new-branch includes pre-existing node 702 (start C1) having an identifier "0:0", node 760 (start C8) having an identifier "0:0:2", node 762 (end C8) having an identifier "0:0:2:0" and node 764 (end C1) having an identifier "0:0:2:0:0". This is a pathway which is newly-detected by agent1.

FIG. 7C1 depicts a tree data structure of a manager which combines the tree data structures of agent1 and agent2 of FIG. 7A1. As mentioned, the tree data structure of the manager can combine tree data structures of different agents to provide a data structure which spans multiple agents and applications or other software. In this case, a first portion of the manager's tree data structure corresponds to a first agent's tree data structure and a second portion of the manager's tree data structure corresponds to a second agent's tree data structure. The dashed line nodes (nodes 744, 746, 748, 750, 752, 754 and 756) correspond to nodes from the agent2 tree data structure, and the dotted line nodes (nodes 790 and 792) are added based on the dashed line nodes. The solid line node of the manager's tree data structure corresponds to the agent1 tree data structure. Since it is known that C2 calls C5, node 704 points to node 744. Since it is known that C5 returns to C2, node 750 points to node 706 for the case where the sequence of nodes 744, 746, 748 and 750 is followed, and additional nodes 790 and 792 are added where node 756 points to node 790 for the case where the sequence of nodes 744, 752, 754 and 756 is followed. Nodes 790 and 792 are the same as nodes 706 and 708, respectively, from the point of view of agent1.

Thus, the manager's (mgr) tree data structure includes these branches: mgr-branch1, mgr-branch2, mgr-branch3 (same as agt1-branch2), mgr-branch4 (same as agt1-branch3), mgr-branch5 (same as agt1-branch4), mgr-branch6 (same as agt1-branch5) and mgr-branch7 (same as agt1-branch6). Mgr-branch1 represents a sequence of invoked components in a cross-subsystem transaction because the transaction involves multiple subsystems. Mgr-branch1 represents a transaction mgr-T1 which combines multiple transactions, e.g., part of transaction agt1-T1 (nodes 702 and 704), followed by transaction agt2-T1 (nodes 744, 746, 748 and 750), followed by a remainder of transaction agt1-T1 (nodes 706 and 708). Recall that transaction agt1-T1 is from subsystem1 and agt2-T1 is from subsystem2. Mgr-branch2 represents a transaction mgr-T2 which combines part of transaction agt1-T1 (nodes 702 and 704), followed by transaction agt2-T1 (nodes 744, 752, 754 and 756), followed by a remainder of transaction agt1-T1 (nodes 790 and 792). Mgr-branch3 represents a transaction mgr-T3 which is the same as transaction agt1-T2 (nodes 702, 710, 712 and 714). Mgr-branch4 represents a transaction mgr-T4 which is the same as transaction agt1-T3 (nodes 702, 710, 712, 716, 718 and 720). Mgr-branch5 represents a transaction mgr-T5 which is the same as transaction agt1-T4 (nodes 702, 710, 712, 722, 724 and 726). Mgr-branch6 represents a transaction mgr-T6 which is the same as transaction agt1-T5 (nodes 728, 730, 732 and 734). Mgr-branch7 represents a transaction mgr-T7 which is the same as transaction agt1-T6 (nodes 728, 736, 738 and 740).

The node identifiers in FIG. 7C1 are the same as in FIG. 7A1 except for: node 744 (0:0:0:0), node 746 (0:0:0:0:0), node 748 (0:0:0:0:0:0), node 750 (0:0:0:0:0:0:0), node 706 (0:0:0:0:0:0:0:0), node 708 (0:0:0:0:0:0:0:0:0), node 752 (0:0:0:0:1), node 754 (0:0:0:0:1:0), node 756 (0:0:0:0:1:0:0), node 790 (0:0:0:0:1:0:0:0) and node 792 (0:0:0:0:1:0:0:0:0). These are identifiers of the manager. The identifiers of mgr-branch1, mgr-branch2, mgr-branch3, mgr-branch4, mgr-branch5, mgr-branch6 and mgr-branch7 are the identifiers of nodes 708, 792, 714, 720, 726, 734 and 740, respectively, as seen by agent1.

When the tree data structure of the manager combines tree data structures of different agents, a transaction of the manager can combine multiple transactions of multiple agents. As an example of a one-to-many correspondence of a manager transaction to agent transactions, mgr-T1 combines agt1-T1 and agt2-T1. See FIGS. 8A1-8A3. In this case, a user interface display of a manager's transaction can be based on multiple, agent transactions.

Alternatively, the tree data structure of the manager need not combine the tree data structures of the different agents, but the manager can maintain a separate tree data structure for each agent which is essentially a copy of each agent's tree data structure. In this case, a transaction of the manager can be the same as a transaction of the agent. As an example of a one-to-one correspondence of a manager transaction to an agent transaction, mgr-T3 is the same as agt1-T2. In this case, a user interface display of a manager's transaction can be based on a single agent transaction.

Or, the manager can maintain both separate tree data structures of the different agents, and a tree data structure which combines the tree data structures of the different agents. The separate tree data structure could be used for branch matching, such as in step 904 of FIG. 9, while tree data structure which combines the tree data structures of the different agents could be used for providing a user interface, such as in steps 1008 and 1010 of FIG. 10A, for instance.

FIG. 7C2 depicts a correspondence between a last node in agent1's tree data structure of FIG. 7A1 and a last node of the manager's tree data structure of FIG. 7C1. As mentioned, the identifier of the last node of a branch in a tree data structure can be used to uniquely identify the branch. In some cases, the same last node identifier is used in the tree data structures of an agent and manager. In other cases, such as when the manager combines tree data structures of different agents, different last node identifiers can be used in the tree data structures of the agent and manager. The manager can maintain a correspondence record between last node identifiers. For example, agent1's last node identifier of 0:0:0:0:0 corresponds to two last nodes of the manager (nodes 708 and 792), having identifiers 0:0:0:0:0:0:0:0 and 0:0:0:0:1:0:0:0:0. The remaining last node identifiers of agent1 (see identifiers of nodes 714, 720, 726, 734 and 740 in FIG. 7A1) are the same as for the manager. Also, agent2's last node identifier of 0:0:0:0:0 corresponds to two last nodes of the manager, having identifiers 0:0:0:0:0:0:0 and 0:0:0:0:1:0:0. In this example, there are no remaining last node identifiers of agent2 to consider. The node # is provided as an aid to understanding and is not necessarily part of the correspondence record.

Thus, when the manager receives a last node identifier from agent1 of a first node sequence, and a last node identifier from agent2 of a second node sequence, it can access its tree data structure based on one or more of these last node identifiers. Moreover, the access can be based on agent1's and/or agent2's last node identifier directly and/or based on the manager's corresponding last node identifier.

Figure 7D:
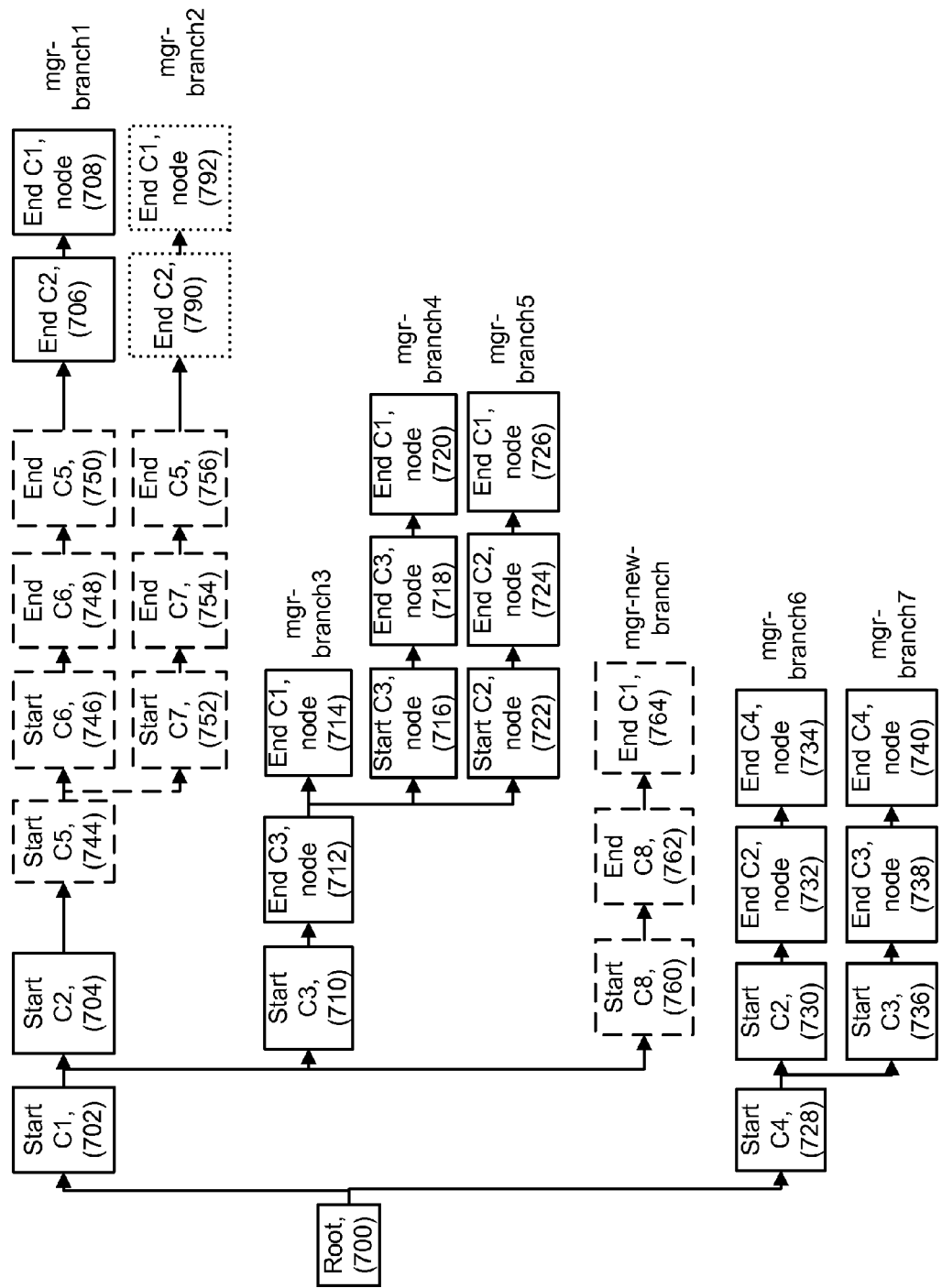
FIG. 7D depicts an update to the tree data structure of the manager of FIG. 7C1 in the form of a new branch, consistent with the update to the tree data structure of agent1 in FIG. 7B.

FIG. 7D depicts an update to the tree data structure of the manager of FIG. 7C1 in the form of a new branch, consistent with the update to the tree data structure of agent1 in FIG. 7B. The update is a new branch, mgr-new-branch, which includes nodes 760, 762 and 764, consistent with the update of agt1-new-branch to agent1's tree data structure.

FIG. 8A1 depicts a record of branches and component invocations for subsystem1 in the tree data structure of FIG. 7A1. Each branch is identified by a last node identifier. For example "0:0:0:0:0" identifies the node 708 in FIG. 7A1, thereby also identifying agt1-branch1 and a corresponding transaction agt1-T1, both in subsystem1. The component invocations for this branch are: start C1 (node 702), start C2 (node 704), end C2 (node 706) and end C1 (node 708).

"0:0:1:0:0" identifies the node 714 in FIG. 7A1, thereby also identifying agt1-branch2 and a transaction agt1-T2, both in subsystem1. The component invocations for this branch are: start C1 (node 702), start C3 (node 710), end C3 (node 712) and end C1 (node 714).

"0:0:1:0:1:0:0" identifies the node 720 in FIG. 7A1, thereby also identifying agt1-branch3 and a transaction agt1-T3, both in subsystem1. The component invocations for this branch are: start C1 (node 702), start C3 (node 710), end C3 (node 712), start C3 (node 716), end C3 (node 716) and end C1 (node 720).

"0:0:1:0:2:0:0" identifies the node 726 in FIG. 7A1, thereby also identifying agt1-branch4 and a transaction agt1-T4, both in subsystem1. The component invocations for this branch are: start C1 (node 702), start C3 (node 710), end C3 (node 712), start C2 (node 722), end C2 (node 724) and end C1 (node 726).

"0:1:0:0:0" identifies the node 734 in FIG. 7A1, thereby also identifying agt1-branch5 and a transaction agt1-T5, both in subsystem1. The component invocations for this branch are: start C4 (node 728), start C2 (node 730), end C2 (node 732) and end C4 (node 734).

"0:1:1:0:0" identifies the node 740 in FIG. 7A1, thereby also identifying agt1-branch6 and a transaction agt1-T6, both in subsystem1. The component invocations for this branch are: start C5 (node 744), start C7 (node 752), end C7 (node 754) and end C5 (node 756).

FIG. 8A2 depicts a record of branches and component invocations for subsystem2 in the tree data structure of FIG. 7A1.

"0:0:0:0:0" identifies the node 750 in FIG. 7A1, thereby also identifying agt2-branch1 and a transaction agt2-T1, both in subsystem2. The component invocations for this branch are: start C5 (node 744), start C6 (node 746), end C6 (node 748) and end C5 (node 750).

"0:0:1:0:0" identifies the node 756 in FIG. 7A1, thereby also identifying agt2-branch2 and a transaction agt2-T2, both in subsystem2. The component invocations for this branch are: start C5 (node 744), start C6 (node 746), end C6 (node 748) and end C5 (node 750).

FIG. 8B1 depicts a record of references to static data for different nodes/components of subsystem1 in the tree data structure of FIG. 7A1. As mentioned, various types of static data can be referenced to a component and its associated nodes. For example, node "0:0" is associated with component C1 and is referenced to static_data_C1 (e.g., methodC1, classC1 and JARC1, etc.) Different records of static data which are referenced are depicted in FIG. 8D, discussed further below. The class name can include names of one or more parent or super classes as well. In one approach, one or more of the nodes are referenced to static data. In another approach, the nodes which represent the start of a component (but not the nodes which represent the end of a component) are referenced to static data. Other approaches are possible. A goal is to enable the manager to access the static data which is associated with a given component or node such as to annotate a user interface, e.g., a transaction trace. The records of FIGS. 8A1 and 8B1 can be provided as part of a tree data structure by an agent and/or by a manager to which the agent reports.

The record can group the nodes which form a branch or a portion of a branch. For example, the first five entries ("0:0" through "0:0:0:0:0") are for agt1-branch1, and the last entry ("0:0:0:0:0") is an identifier of the branch. The entries 0:0:1, 0:0:1:0 and 0:0:1:0:0 are for nodes in agt1-branch2 which are not in agt1-branch1.

The nodes can be referenced directly to one or more types of static data, or to an identifier which is referenced to the one or more types of static data. In this way, the static data identifier can be repeated efficiently in the record without repeating the one or more types of static data.

The static data can be obtained from the instrumentation of the software, including instrumentation of the one or more components to which the static data is referenced.

The static data of a transaction can be obtained mostly from instrumentation. However, as a principle, it can be obtained from other sources, and mashed up or combined with other static data if necessary. For example, it can be detected from other sources that a given piece of code is statically always related to a given application, or statically always going to be of lower priority. This information may be used to determine the behavior of the trace.

Static data include all types of information which are available from tracing the software. Static data can also indicate that a given component can be called by only a limited number of one or more parent components and/or that the given component can call only a limited number of one or more child components, because of the way the software is structured. For example, the static data may indicate that C2 is only called by C1 or C4, and that C2 only calls C5. Static data can also indicate that a given component can call only a limited number of one or more child components, based on one or more parent components which called the given component. In terms of the tree data structure, for instance, a given node may only have one child node based on how the given node was reached, e.g., in a given context. This information can be useful in the matching step 904 as well as in segregating transaction data according to a transaction context.

As another example, a servlet can call many different methods of a database using SQL statements. But, the servlet will not call the methods arbitrarily all the time. It will call some SQLs if something has happened previously or other SQLs if something else has happened previously. This provides a partition of the SQLs that is relevant according to the business logic. For example, if a transaction is to buy a book on a web site, one portion of the database logic is used, while if a transaction is to buy a hat on a web site, another portion of the database logic is used. In both cases, the servlet may use the same socket to make the database call. But, the use of the tree data structure allows data to be gathered in a specific transaction context. This data can include a transaction trace and the metrics it yields such as response time, as well as other metrics which are obtained for a transaction.

The static data can be cached by the agent so that it does not have to be repeatedly retrieved from the software and/or the instrumentation.

FIG. 8B2 depicts a record of references to static data for different nodes/components of subsystem2 in the tree data structure of FIG. 7A1. These records can be provided as part of a tree data structure by an agent of subsystem2 and reported to an associated manager. This can be the same manager that the agent of subsystem1 reports to, for instance. Multiple agents can report to a common manager. In the record, as an example, node "0:0" is associated with component C5 and is referenced to static_data_C5.

FIG. 8B3 depicts an update to the record of FIG. 8B1 for agt1-new-branch in FIG. 7B. The nodes 760, 762 and 764 have identifiers 0:0:2, 0:0:2:0 and 0:0:2:0:0, respectively, and are indexed to static_data_C8, static_data_C8 and static_data_C1, respectively.

FIG. 8B4 depicts a record of references to static data for different nodes/components of a manager in the tree data structure of FIG. 7C1. Each node has associated static data, as discussed.

FIG. 8B5 depicts an update to the record of FIG. 8B4 for mgr-new-branch7 in FIG. 7D. The nodes 760, 762 and 764 have identifiers 0:0:2, 0:0:2:0 and 0:0:2:0:0, respectively, and are indexed to static data C8, static_data_C8 and static_data_C1, respectively. The update is the same as in FIG. 8B3, in this example, due to the common node identifiers. In other cases, the updates can differ, e.g., due to different node identifiers.

FIG. 8C depicts a record of dynamic data from tracing details for different nodes/components of subsystem1 of the tree data structure of FIG. 7A1. The record can be provided as part of a tree data structure by an agent of subsystem1 and reported to an associated manager. Dynamic data can be obtained by an agent by tracing at least one application or other monitored software instance. The dynamic data can indicate the start and end times of components. Other dynamic can include parameters passed in calls between components. For example, in FIG. 5A, C1 can call C2 with one or more parameters related to a requested report, e.g., a type of the report or a date range of the report. When the control flow returns to C1, C2 can pass one or more related parameters to C1. Each subsystem, via its associated agent, can obtain dynamic data and report it to a manager. The record can be provided as part of a tree data structure by an agent of subsystem1 and by a manager to which the agent reports.

The dynamic data includes an entry for node "0:0", which is associated with C1, and which includes a start time (t1) for C1 and other associated dynamic data (dynamic_data_1), such as a parameter1 passed in a call to C1. An entry for node "0:0:0" is associated with C2, and includes a start time (t2) for C2 and other associated dynamic data (dynamic_data_2), such as a parameter2 passed in a call to C2. An entry for node "0:0:0:0" is associated with C2, and includes an end time (t3) for C2 and other associated dynamic data (dynamic_data_3), such as a parameter3 passed in a return to C2, e.g., a return of a program flow to C2 from a component which was called by C2. An entry for node "0:0:0:0:0" is associated with C1, and includes an end time (t4) for C1 and other associated dynamic data (dynamic_data_4), such as a parameter4 passed in a return to C1, e.g., a return of a program flow to C1 from a component which was called by C1.

FIG. 8D depicts records of static data associated with different components. Each record can include various types of static data as discussed herein. The records of static data include static_data_C1, static_data_C2, static_data_C3, static_data_C4, static_data_C5, static_data_C6, static_data_C7 and static_data_C8. The records of static_data can be maintained by the agent and manager.

FIG. 9 depicts an example process in which an agent maintains a tree data structure such as in FIG. 7A1 for at least one application. Step 900 includes maintaining a tree data structure with branches which represent sequences of invoked components of at least one application, such as by start and stop points of the components. Step 902 includes, during a transaction, e.g., an instance of a transaction, where the transaction can be invoked in multiple instances over time, identifying a sequence of invoked components of the at least one application. For example, this can include tracing the transaction. A particular transaction of interest may be referred to as a subject transaction.

Step 908 includes, during the transaction, obtaining dynamic data, e.g., metrics, for the sequence of invoked components, including start and end times of the invoked components. This dynamic data can be obtained from the transaction trace. At decision step 904, a determination is made as to whether there is a matching branch in the tree data structure. For example, assume a transaction trace results in the following sequence of invoked components: start C1, start C2, end C2, end C1. This sequence can be compared in turn to each branch in the tree data structure of FIG. 7A1, for instance, until a matching branch is found. In one approach, the comparison proceeds one branch at a time, starting at a first branch. In another approach, branches which have a number of nodes which corresponds to the number of start and end points of the transaction trace are first compared. Other approaches are possible as well. In this example, agt1-branch1 is a matching branch. Step 906 includes reporting the dynamic data and an identifier of the matching branch (e.g., agt1-branch1, or node 0:0:0:0:0) to the manager. The dynamic data could be reported as a list of start and stop times of the invoked components, for instance, where each time corresponds to one of the nodes of the branch, and the order of the reported times corresponds to the order of nodes in the branch. The time can be a time stamp, for instance, based on a clock of the agent.

A matching branch can be a branch which has the same number of nodes as the number of start and end points of the sequence of invoked components of the transaction, where the sequence of nodes in the branch matches the start and end points of the sequence of invoked components of the transaction. The root node of the tree need not be considered in the matching. In some case, a branch can have a sequence of nodes which match the start and end points of the sequence of invoked components of the transaction, but have additional nodes as well. In this case, there is a partial match for the start and end points of the sequence of invoked components of the transaction, and decision step 904 is false. In this case, the subject transaction trace provides a new sequence of start and end points of a sequence of invoked components which is not exactly represented by, and co-extensive with, a branch of the tree data structure. In response to determining this, step 910 includes updating the tree data structure with a branch which represents, and is co-extensive with, the sequence of invoked components. For example, this can be agt1-new-branch in FIG. 7B. A co-extensive branch has the same start and end points as the sequence.

At step 912, the updating can include providing nodes which represent start and end points of one or more invoked components in the transaction trace, in a new branch. For example, in FIG. 7B, agt1-new-branch includes the newly added nodes 760, 762 and 764. The new branch can overlap in part with one or more existing branches. For example, in FIG. 7B, node 702 is present (overlapping) in agt1-branch1, agt1-branch2 and agt1-new-branch, so that agt1-new-branch overlaps with agt1-branch1 and agt1-branch2.

Thus, the sequence of invoked components of the new transaction is represented in the tree data structure by a branch (e.g., agt1-new-branch) having an overlapping portion (node 702) which overlaps with at least one of the pre-existing branches (e.g., agt1-branch1 and agt1-branch2) and a non-overlapping portion (a branch portion including nodes 760, 762 and 764) which does not overlap with any of the pre-existing branches. The new nodes (nodes 760, 762 and 764) are provided in the non-overlapping portion but not in the overlapping portion.

In FIG. 9, step 914 indicates that the updating of the tree data structure includes indexing, to the nodes, static data associated with the one or more of the invoked components. The static data of a component can be accessed by the agent from instrumentation of the component, and indexed as discussed in connection with FIG. 8B3.

Step 916 includes reporting the update of the tree data structure from the agent to the manager. The update can identify start and end points of the one or more of the invoked components of the subject transaction instance, and indexes to associated static data. This report can be provided in the form of a branch definition as set forth in FIG. 8A1 or 8A2, and the references to static data as set forth in FIG. 8B1 or 8B2.

After updating the tree data structure based on the new transaction, decision step 904 will be true when the sequence of invoked components of the transaction trace is again compared to the updated tree data structure. Step 906 includes reporting dynamic data and an identifier of the matching branch from the agent to the manager. This report can be provided, e.g., in the form of the record of FIG. 8C. Upon receipt of this report, the manager can update its tree data structure so that it is synchronized with the agent's tree data structure. Thus, the agent can efficiently report the transaction to the manager while reducing overhead costs such as the amount of bandwidth needed to send data over a communication path and/or the amount of memory needed to communicate and store such data.

Figure 10B:
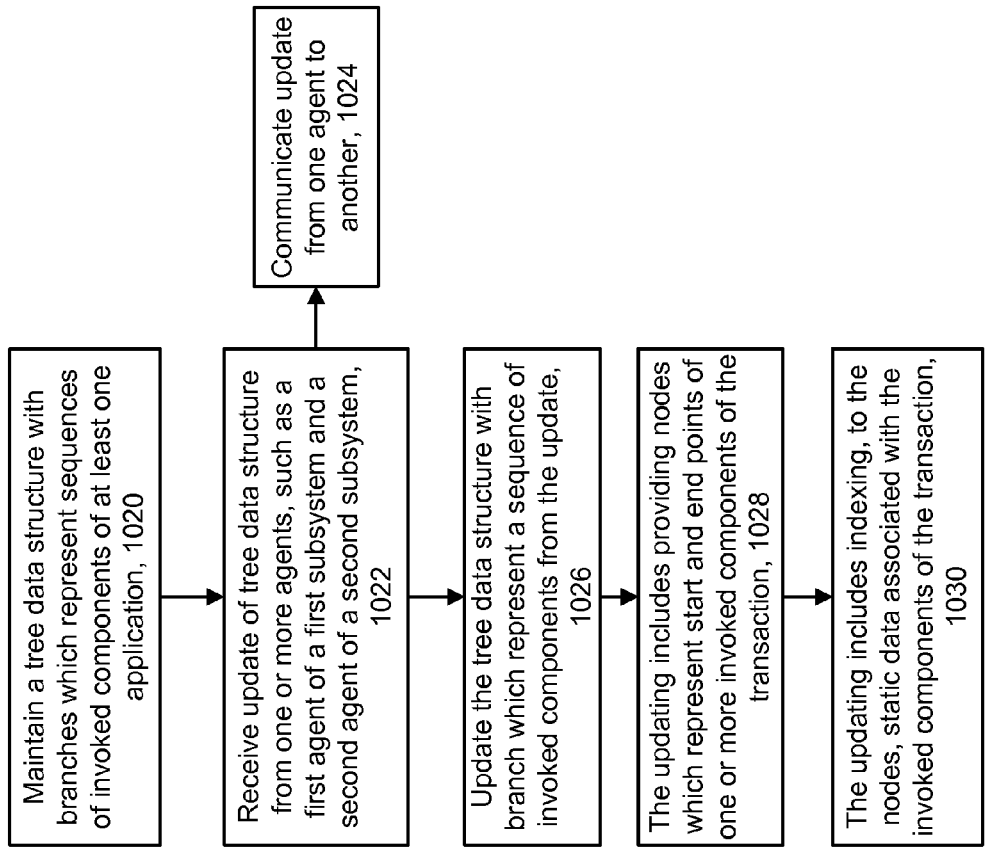
FIG. 10B depicts an example process in which a manager updates a tree data structure such as in FIG. 7A1-7C1 based on updates received from one or more agents.
Figure 10A:
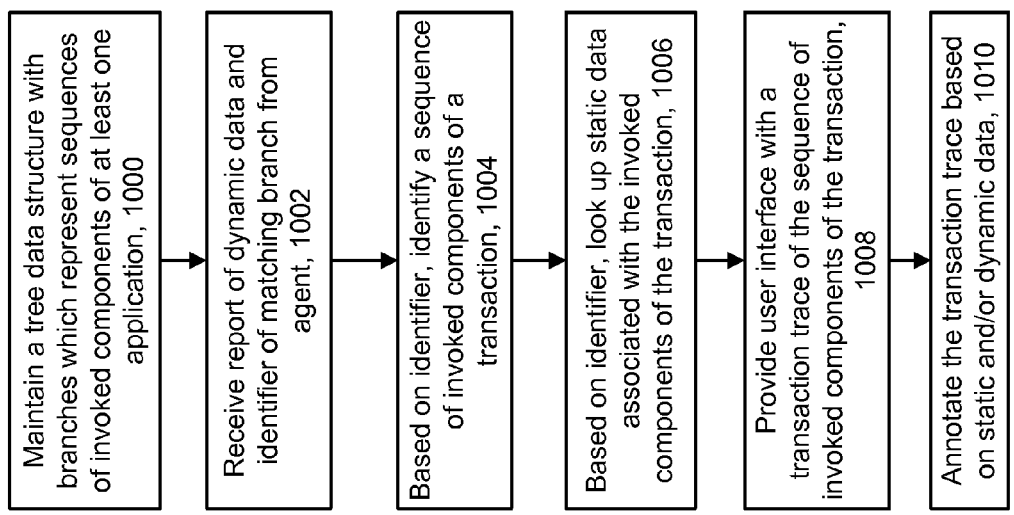
FIG. 10A depicts an example process in which a manager provides a user interface based on a report of dynamic data and a branch identifier of a tree data structure such as in FIG. 7A1, as received from an agent.

FIG. 10A depicts an example process in which a manager provides a user interface based on a report of dynamic data and a branch identifier of a tree data structure such as in FIG. 7A1, as received from an agent. Step 1000 includes maintaining a tree data structure of the manager with branches which represent sequences of invoked components of at least one application, such as by start and stop points of the components. Step 1002 includes receiving a report of dynamic data and an identifier of a matching branch from an agent. Step 1004 includes, based on the identifier, identifying a sequence of invoked components. This can involve accessing a record such as in FIG. 8A1 to determine that agt1-branch1 is identified by the branch whose last node identifier is "0:0:0:0:0", and that this branch includes the components sequence of: start C1, start C2, end C2 and end C1.

Alternatively, step 1004 can include accessing a record such as in FIG. 7C2 to determine that agent1's last node of 0:0:0:0:0 corresponds to the manager's last node of 0:0:0:0: 0:0:0:0:0, and accessing a record such as in FIG. 8A3 to determine that mgr-branch1 is identified by the manager's last node of 0:0:0:0:0:0:0:0:0, and that this branch includes the components sequence of: start C1, start C2, start C5, start C6, end C6, end C5, end C2, end C1.

Step 1006 includes, based on the identifier, looking up static data associated with the invoked components of the transaction. This can involve accessing a record such as in FIG. 8B1, e.g., to identify static_data_C1 which is indexed to node/branch identifier "0:0:0:0:0" and each of the nodes of the branch. Alternatively, this can involve accessing a record such as in FIG. 8B4, e.g., to identify static_data_C1 which is indexed to node/branch identifier "0:0:0:0:0:0:0:0:0" and each of the nodes of the branch.

Step 1008 includes providing a user interface (UI) with a transaction trace of the sequence of invoked components of the transaction. The transaction trace can be provided directly from the identified branch, since the branch identifies the start and stop of each component of the branch. Examples of transaction traces which can be provided on a user interface are in FIGS. 6A-6I, 11A and 11B. Step 1010 includes annotating the transaction trace based on the static and/or dynamic data, such as depicted in FIGS. 11A and 11B. This can include displaying the static and/or dynamic data on the user interface. As another example, a UI could be provided such as discussed in connection with FIGS. 14A-14C.

FIG. 10B depicts an example process in which a manager updates a tree data structure such as in FIG. 7A1-7C1 based on updates received from one or more agents. Step 1020 includes maintaining a tree data structure with branches which represent sequences of invoked components of at least one application, such as by start and stop points of the components. Step 1022 includes receiving an update of a tree data structure from one or more agents, such as a first agent of a first subsystem and a second agent of a second subsystem. Step 1024 includes communicating an update from one agent to another. The manager can pass on or relay an update which is received from one agent to another agent, when the agents monitor different instances of the same software. In this way, new transactions can be propagated quickly among agents so that the tree data structures of the agents are synchronized. Step 1026 includes updating the tree data structure of the manager with a branch which represents a sequence of invoked components from the update. For example, this can include adding the mgr-new-branch in FIG. 7D. The update can involve updating the records of the manager's tree data structure, e.g., based on the record of FIG. 8B3.

In step 1028, the updating includes providing nodes which represent start and end points of one or more invoked components of the transaction. For example, this can include adding the nodes 760, 762 and 764 of mgr-new-branch in FIG. 7D. In step 1030, the updating includes indexing, to the nodes, static data associated with the invoked components of the transaction, such as depicted in connection with the records of FIG. 8B5. Note that the update to the manager's tree data structure can include some of the nodes of the agent's tree data structure (e.g., nodes 760, 762 and 764) but not other of the nodes of the agent's tree data structure (e.g., node 702), in the example of mgr-new-branch of FIG. 7D.

FIG. 11A depicts the transaction trace of FIG. 6A with annotation using static and dynamic data. The transaction traces provide a complete picture of a transaction/execution flow. Here, the annotation is provided in the graph region 600 for C1 and in the graph region 602 for C2. The annotation "methodC1|classC1|JARC1|dynamic_data_1" includes three types of static data followed by dynamic data, where each piece of data is separated by a vertical bar. However, other formats are possible. For example, the annotation can be provided outside the graph regions of the transaction trace, e.g., above or to the side, in a mouse over or hover box, tooltip, by right-clicking to access information, in a pop up window, separate window or display screen, and so forth. The dynamic data can be distinguished separately from the static data by its appearance, color, font, location, etc.

FIG. 11B depicts the transaction trace of FIG. 6A with annotation using static and dynamic data. The annotation is provided in the graph region 610 for C5 and in the graph region 612 for C6. Note that the transaction traces of FIGS. 11A and 11B could be displayed on the same user interface concurrently, to provide the user with a better understanding of the behavior of a transaction which extends across subsystems. Recall that C1 and C2 are in subsystem1 and C5 and C6 are in subsystem2. If the clocks of the subsystems are adequately synchronized, the transaction traces of the subsystems can be displayed using a common time line reference. If the synchronization is not assured, the transaction traces of the subsystems can be displayed using separate time line references. The manager can decide to associate the two transaction traces in the user interface based on a correlation identifier which C2 provides to C5 when calling it. The agents provide the correlation identifier to the manager when reporting the transaction traces using the tree data structure to indicate that the traces should be associated. For further information, see US2007/0143323, published Jun. 21, 2007, titled "Correlating Cross Process And Cross Thread Execution Flows In An Application Manager," incorporated herein by reference.

For example, when C2 is invoked in the transaction agt1-T1, it can include an identifier of agt1-T1 when it calls C5. Agent1, when reporting to the manager regarding the transaction agt1-T1, includes the identifier agt1-T1. Similarly, agent2, when reporting to the manager regarding the transaction agt2-T1, includes the identifiers agt1-T1 and agt2-T1. The manager then knows that the transactions/transaction traces of the identifiers agt1-T1 and agt2-T1 are associated.

Another example user interface provides the tree data structures of FIGS. 7A1-7D directly, e.g., by displaying the nodes and edges between them. Status and dynamic data can be displayed within or next to the nodes.

Figure 12A:
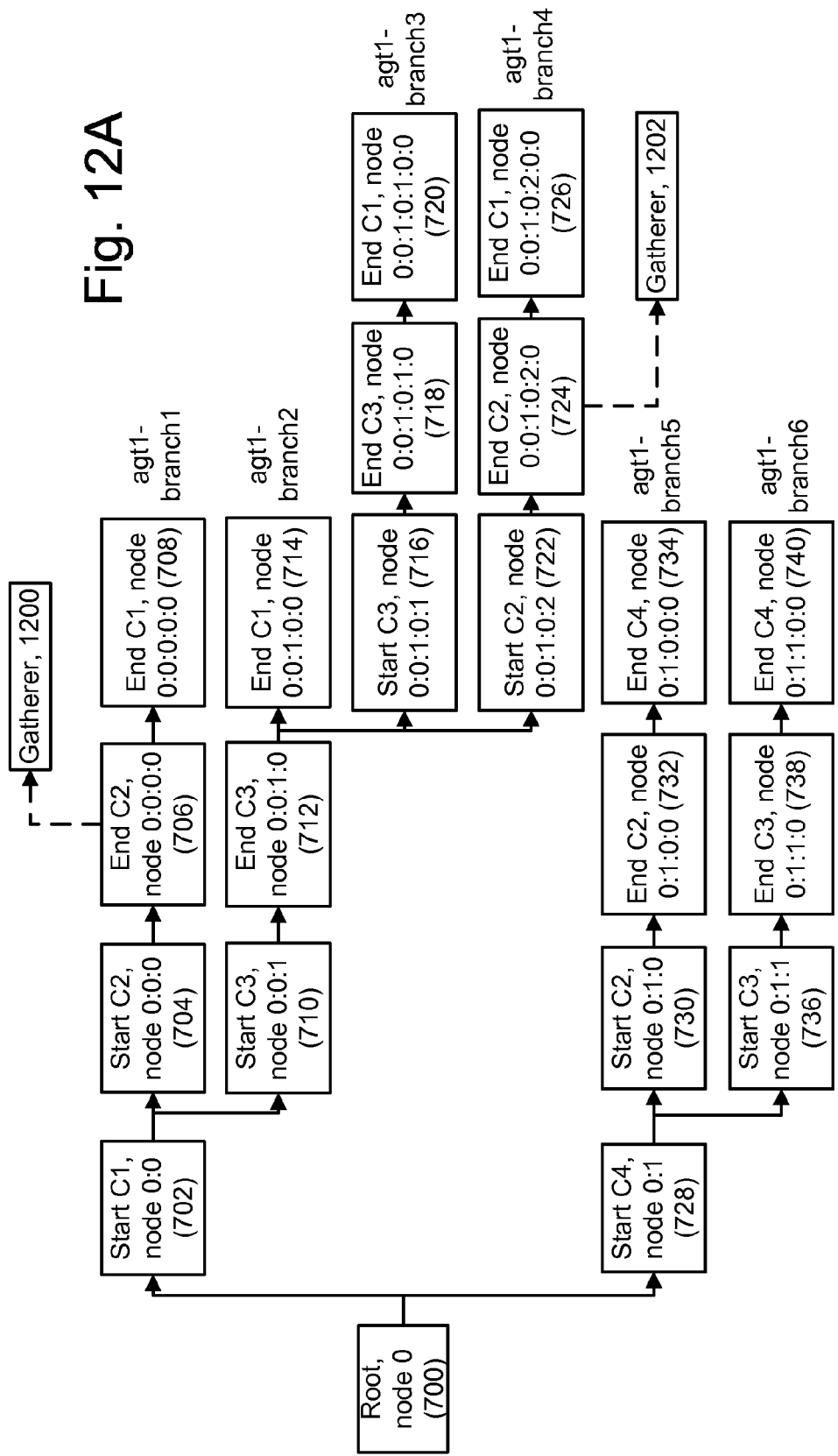
FIG. 12A depicts the tree data structure of FIG. 7A1 with a gatherer linked to a node for one component in a respective branch of a respective transaction.

FIG. 12A depicts the tree data structure of FIG. 7A1 with a gatherer linked to a node for one component in a respective branch of a respective transaction. One or more gatherers can be associated with nodes of the tree data structure. One or more gatherers can be associated with one node, and one or more nodes can be associated with one gatherer. The one or more nodes associated with one gatherer can represent one or more components.

In one approach, a gatherer is a software process in the agent code which gathers one or more metrics of a component represented by the node. The agent can use a basic data structure of the pair <agent metric, gatherer> that is connected to instrumented components such as methods in a managed application. The metrics are gathered, e.g., when instrumentation code of the component is triggered when the component is invoked. For example, the metrics can include a count of invocations, which is a number of times an instance of a component represented by the node has been invoked, a response time, which is a response time of an instance of a component represented by the node, an average of such response times across multiple invocations, an error metric which indicates whether an error message is associated with the component represented by the node, or any other metric including those discussed herein. By linking a gatherer to a node in the tree, an invocation of a component represented by the node can be linked to a context of the gatherer. Similarly, the gatherer can be linked only to that node, in which case, there is a one-to-one linking of the gatherer to the context of the branch and the respective transaction represented uniquely by the branch.

One valuable business objective for the agent is to provide metrics segregated by transaction type (transaction separability). For example, we would like to report response time for a given backend (or for some specific SQL statements invoked on the backend) for each identified transaction type on a given customer application, for example, for the transaction "Buy book" and for the transaction "Buy CD." One step toward this objective is the ability to efficiently deliver "transaction" metric sets, e.g., metrics whose values are partitioned by the specific transactions that have been invoked in the customer application.

The tree data structure can be used for this purpose. As mentioned, the tree describes transactions through a branching sequence of transaction points or nodes. The edges of the sequence are called transaction segments. The transaction structure has a lifecycle that is equivalent to the longevity of the code from which it is detected. The transaction structure is first detected by an agent that instruments the application with a modified tracer. The transaction structure is then shared with other agents and a manager. The transaction structure is also permanently stored in a database of the manager.

The agent decorates each point of interest in the transaction structure with a set of one or more gatherers. Each gatherer is associated with a multiple set of possible metrics. The agent gathers the "numbers" for the metrics and, because of the agent structure, is able to determine the specific values that are associated with each one of the possible transaction paths. Some kinds of gatherers can be associated with more than one transaction structure element or node. For example, concurrent invocation gatherers are associated with all the transaction structure elements that are related to the metric being gathered.

Additionally, the agents can receive updates from the manager regarding the transaction structures detected by other agents. This allows, for example, having agents reporting efficiently in case of cross-JVM transactions.

In this example, a gatherer 1200 is linked only to the node 706 in transaction agt1-T1 and a gatherer 1202 is separately linked only to the node 724 in transaction agt-T4. Nodes 706 and 724 both represent an end of the invocation of C2, e.g., a stop time of C2, but in the different contexts of the respective transactions agt1-T1 (represented by agt1-branch1) and agt1-T4 (represented by agt1-branch4). To allow better understanding of the performance of a monitored application, it can be helpful to segregate metrics for a given component according to one or more transaction contexts. This may indicate, for example, that a performance problem regarding a component occurs in one specific transaction context but not in another context. The specific context which is problematic can then be investigated further. The gatherers can be configured, e.g., based on operator experience, for instance, or based on an automated analysis which detects problematic components and/or transactions.

A gatherer allows metrics to be obtained and reported selectively based on one or more selected nodes in the tree. Since the components are instrumented, it is possible to obtain and report metrics for all occurrences of the components. However, this can lead to unnecessary overhead costs. It is efficient to gather and report metrics only on an as-needed basis. It is also useful to gather and report metrics which are transaction-segregated. For example, metrics obtained at node 706 by the gatherer 1200 are for an invocation C2 in the context of agt1-T1. Alternatively, if the gatherer was linked to nodes 706, 724 and 732, the metrics obtained would not be specific to a subset of fewer than all transactions in which C2 is invoked. The gatherer 1200 and any other depiction of a gatherer herein is meant to represent an entity which can gather one or more types of metrics.

In another approach, as mentioned, one gatherer can be linked to multiple transactions so that at least one metric obtained by a gatherer is associated with components of the multiple transactions. Generally, a number of variations are possible including: (1) at least one metric of a gatherer is associated with one component instance in one transaction (e.g., the gatherer 1200 linked to an instance of C2 in node 706 in agt1-T1 in FIG. 12A), (2) at least one metric of a gatherer is associated with multiple instances of one component in one transaction (e.g., the gatherer 1206 linked to instances of C3 in nodes 712 and 718 in agt1-T3 in FIG. 12C), (3) at least one metric of a gatherer is associated with one component instance of one component, and one component instance of another component, in one transaction (e.g., the gatherer 1200 linked to an instance of C2 in node 706 in agt1-T1 in FIG. 12A, modified by the gatherer 1200 also being linked to an instance of C1 in node 708 in agt1-T1), and (4) at least one metric of a gatherer is associated with one component instance of one component in one transaction, and one component instance of another component in another transaction (e.g., the gatherer 1200 linked to an instance of C2 in node 706 in agt1-T1 in FIG. 12A, modified by the gatherer 1200 also being linked to an instance of C1 in node 714 in agt1-T2). In case (4), the at least one metric is for multiple transactions, e.g., the one transaction and the another transaction.

Figure 12B:
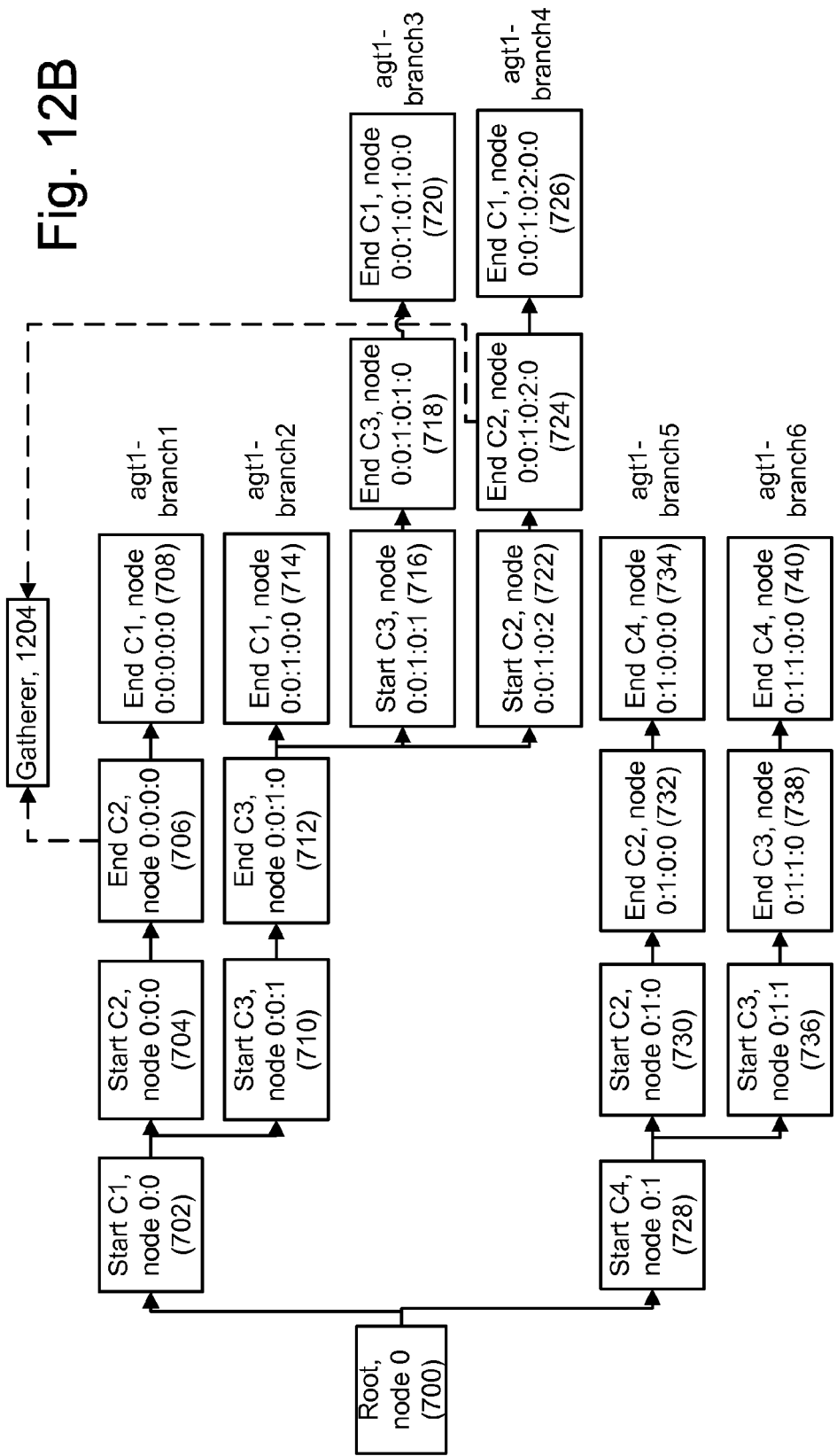
FIG. 12B depicts the tree data structure of FIG. 7A1 with a gatherer linked to nodes for multiple occurrences of the same component in different respective branches of different respective transactions.

FIG. 12B depicts the tree data structure of FIG. 7A1 with a gatherer linked to nodes for multiple occurrences of the same component in different respective branches of different respective transactions. A gatherer 1204 is linked in a one-to-many relationship with nodes in the tree, namely nodes 706 and 724, which are in different respective transactions. In this case, metrics obtained by the gatherer 1204 are aggregated across the different instances of C2 and the respective transactions. The metrics are gathered in a context of the gatherer 1204 and not in a unique transaction context. The metrics are gathered in a context of a group of transactions which includes agt1-T1 and agt1-T4. This can be useful, e.g., when it is desired to know that one or more of the instances of the components were invoked in a group of transactions, but it is not necessary to distinguish the transaction in which each invocation occurred.

Figure 12C:
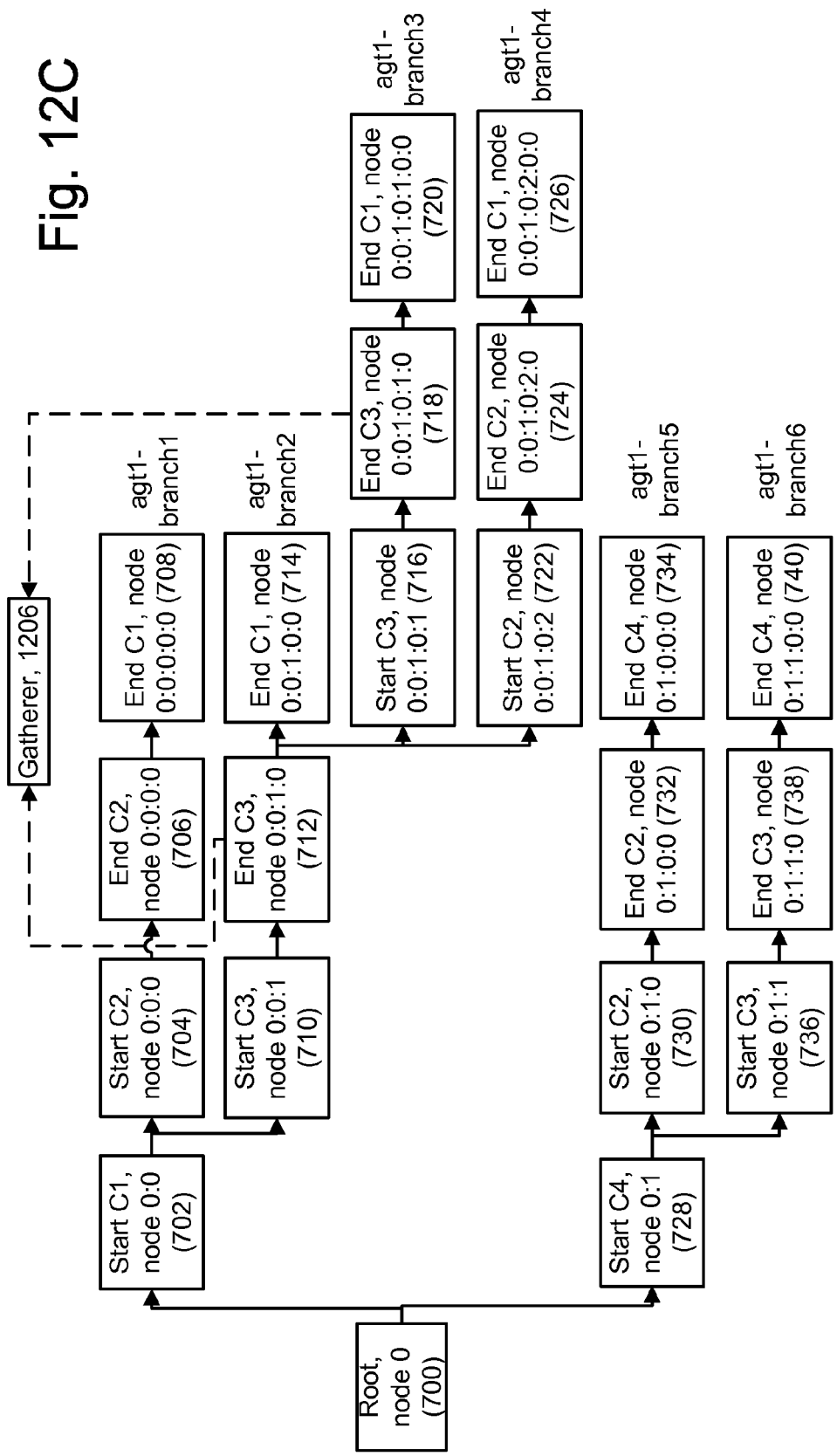
FIG. 12C depicts the tree data structure of FIG. 7A1 with a gatherer linked to nodes for multiple occurrences of the same component in a same respective branch of a respective transaction.

FIG. 12C depicts the tree data structure of FIG. 7A1 with a gatherer linked to nodes for multiple occurrences of the same component in a same respective branch of a respective transaction. Here, a gatherer 1206 is linked in a one-to-many relationship with nodes in the tree, namely nodes 712 and 718, which are in the same transaction and represent different instances of the same component, C3 in the transaction agt1-T3. In this case, metrics obtained by the gatherer 1206 are aggregated across the different instances of C3 in the transaction agt1-T3. The metrics are gathered in a unique transaction context. This can be useful, e.g., when it is desired to know that one or more of the instances of a component were invoked in a transaction, but it is not necessary to distinguish metrics of the different instances.

Recall that agt1-T2 includes the sequence of nodes: 702, 710, 712 and 714, agt1-T3 includes the sequence of nodes: 702, 710, 712, 716, 718 and 720, and agt1-T4 includes the sequence of nodes: 702, 710, 712, 722, 724 and 726, as discussed in connection with FIG. 7A1. Note that, when one or more metrics are obtained for a component invocation corresponding to node 712, the transaction is not yet uniquely defined because any one of three different node sequences can follow node 712. In this case, the metrics are gathered and subsequently, a decision can be made to discard the metrics, and not report them to the manager, if the transaction is not of a specified identity. That is, in one approach, the gatherer 1206 can be linked to the node 712 but only when node 712 is part of a specific transaction, e.g., agt1-T2, agt1-T3 or agt1-T4.

In contrast, when one or more metrics are obtained for a component invocation corresponding to node 718, the transaction (agt1-T3) is uniquely defined because only one node sequence can follow node 718. In this case, the metrics are gathered and it is decided that they will be reported to the manager. For example, the agent may report information such as metrics to the manager periodically, such as very few minutes. Typically, a transaction will have concluded or otherwise progressed to a point where it can be uniquely identified, before a next reporting time. The agent may store the metrics for a not-yet-identified transaction as they are gathered until the transaction is identified, at which time a determination can be made to discard the metrics, report the metrics to the manager, and/or take some other action.

In another approach, a decision as to whether metrics are to be reported is made after a transaction is complete and identified. See also FIGS. 16A and 16B, which relate to processing by the agent and manager, respectively, when transaction-segregated metrics are provided.

Gatherers of different types, such as depicted in FIGS. 12A-12C, can be used in combination as well.

FIG. 13A depicts a record of references to the gatherers 1200 and 1202 for the tree data structure of FIG. 12A. The agents and managers can store the records, for instance. A first entry of the record indicates that the gatherer 1200 is linked to a node having an identifier of 0:0:0:0 and representing a component C2 and a transaction agt1-T1. A second entry of the record indicates that the gatherer 1202 is linked to a node having an identifier of 0:0:1:0:2:0 and representing a component C2 and a transaction agt1-T4.

FIG. 13B depicts a record of references to the gatherer 1204 for the tree data structure of FIG. 12B. A first entry of the record indicates that the gatherer 1204 is linked to a node having an identifier of 0:0:0:0 and representing a component C2 and a transaction agt1-T1. A second entry of the record indicates that the gatherer 1204 is also linked to a node having an identifier of 0:0:1:0:2:0 and representing a component C2 and a transaction agt1-T4.

FIG. 13C depicts a record of references to the gatherer 1206 for the tree data structure of FIG. 12C. A first entry of the record indicates that the gatherer 1206 is linked to a node having an identifier of 0:0:1:0 and representing a component C3 and a transaction agt1-T3. A second entry of the record indicates that the gatherer 1206 is also linked to a node having an identifier of 0:0:1:0:1:0 and also representing the component C3 and the transaction agt1-T3.

Figure 14A:
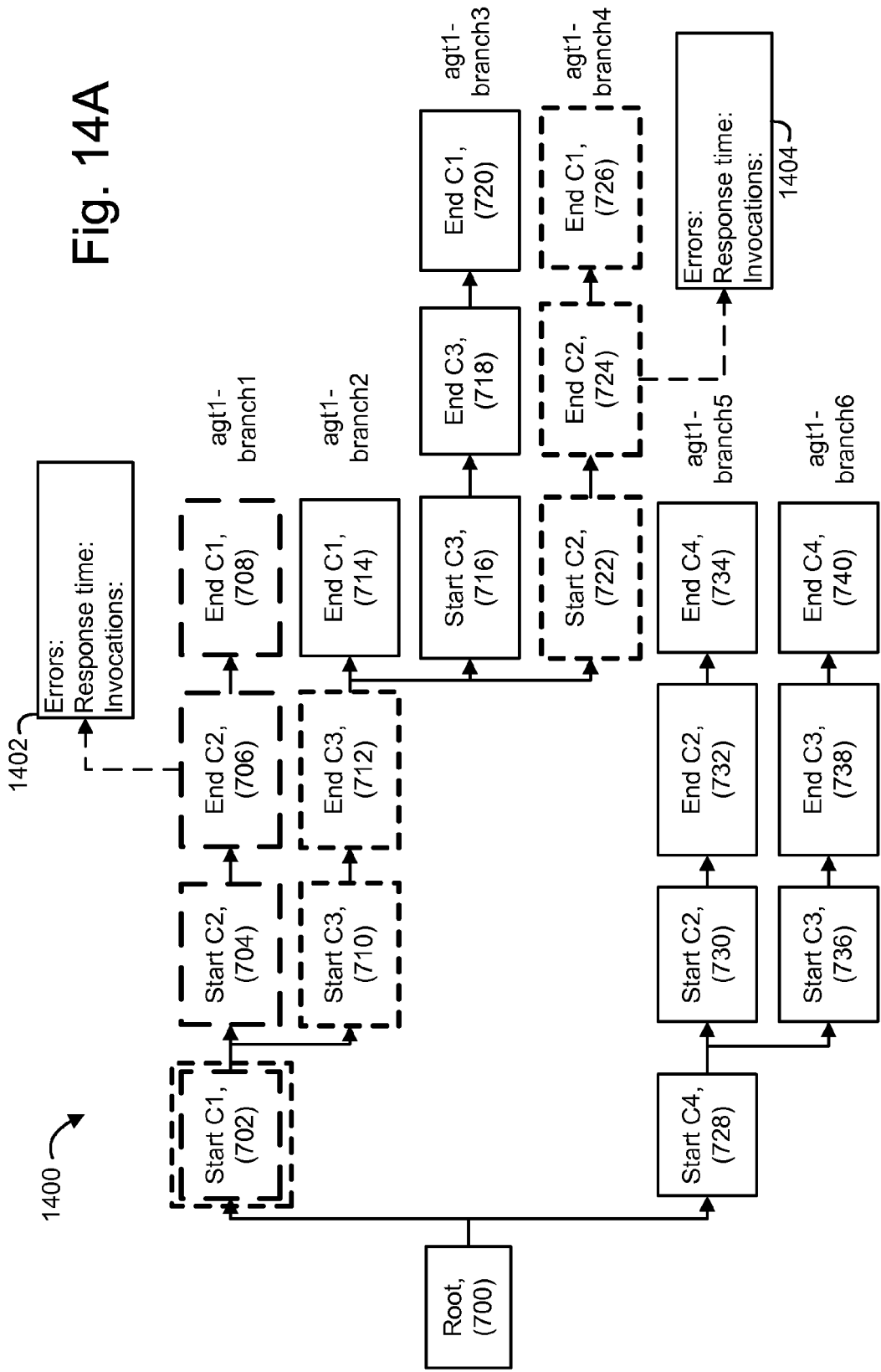
FIG. 14A depicts an example user interface based on the tree data structure of FIG. 13A.

FIG. 14A depicts an example user interface based on the tree data structure of FIG. 13A. Various types of user interface (UI) displays can be provided based on information, including metrics, branch identifiers and gatherer identifiers, which are received by a manager from one or more agents. In one possible approach, a UI display 1400 includes the tree data structure and its nodes. Visual characteristics such as line color, pattern, width or fill color or pattern, can be used to identify the nodes of one or more transactions of interest and distinguish them from the nodes of one or more transactions which are not of interest. Similarly, visual characteristics can be used to identify the components of interest and distinguish them from the components which are not of interest.

For example, heavy long-dashed lines are used for nodes 702, 704, 706 and 708 to identify agt1-T1, and heavy short-dashed lines are used for nodes 702, 710, 712, 722, 724 and 726 to identify agt1-T4. A region 1402 provides example metrics regarding the component instance represented by node 706 based on data gathered by the gatherer 1200. A region 1404 provides example metrics regarding the component instance represented by node 724 based on data gathered by the gatherer 1202. The metrics can include, e.g., errors, average response time and number of invocations in the context of the transaction agt1-T1 and, separately, in the context of agt1-T4.

Figure 14B:
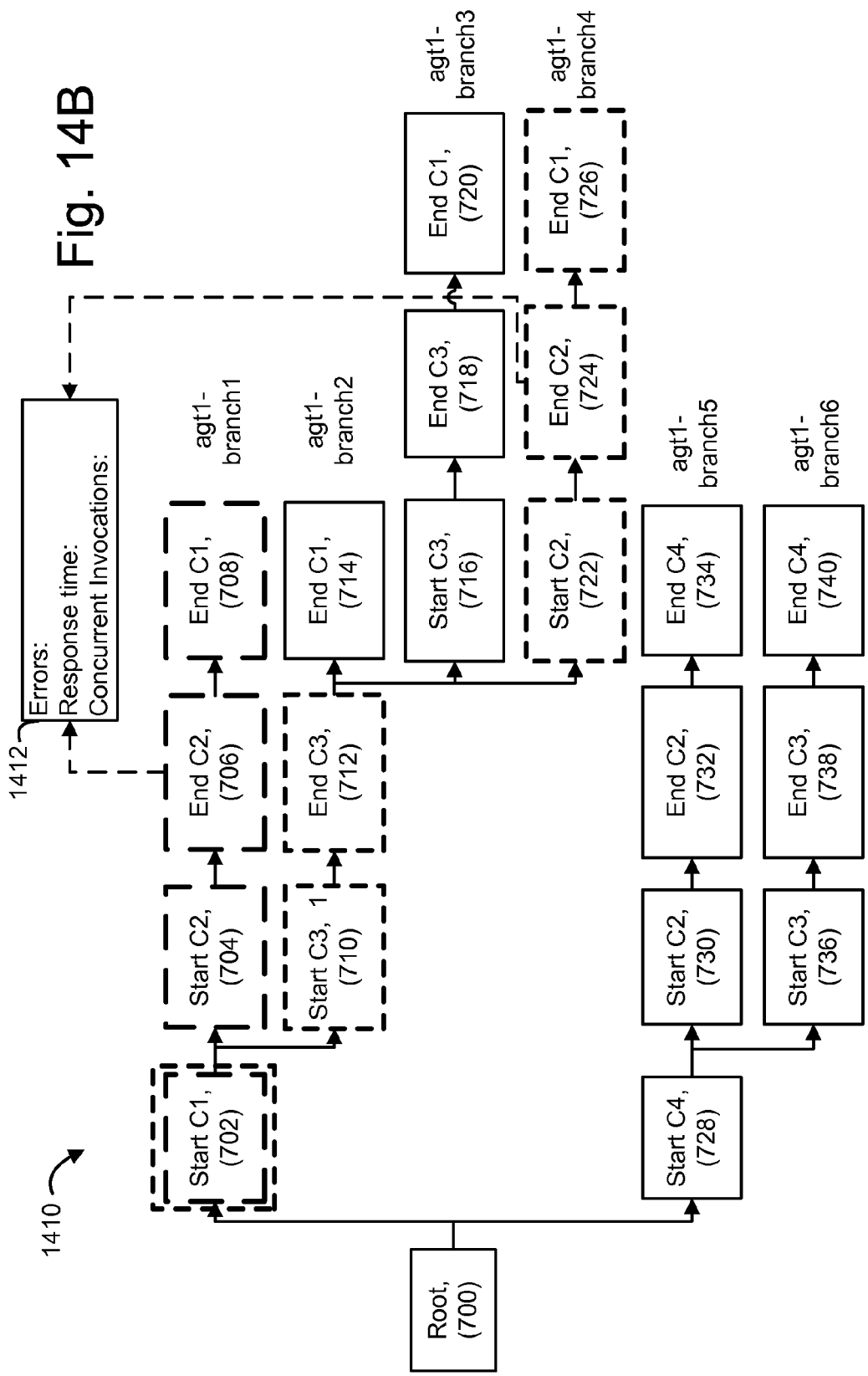
FIG. 14B depicts an example user interface based on the tree data structure of FIG. 13B.

FIG. 14B depicts an example user interface based on the tree data structure of FIG. 13B. In the UI display 1410, as in the UI display 1400, heavy long-dashed lines are used for nodes 702, 704, 706 and 708 to identify agt1-T1, and heavy short-dashed lines are used for nodes 702, 710, 712, 722, 724 and 726 to identify agt1-T4. A region 1412 provides example metrics regarding the component instances represented by nodes 706 and 724, based on data gathered by the gatherer 1200. The metrics can include, e.g., errors, average response time and number of invocations in the context of a group of transaction which include agt1-T1 and agt1-T4.

Figure 14C:
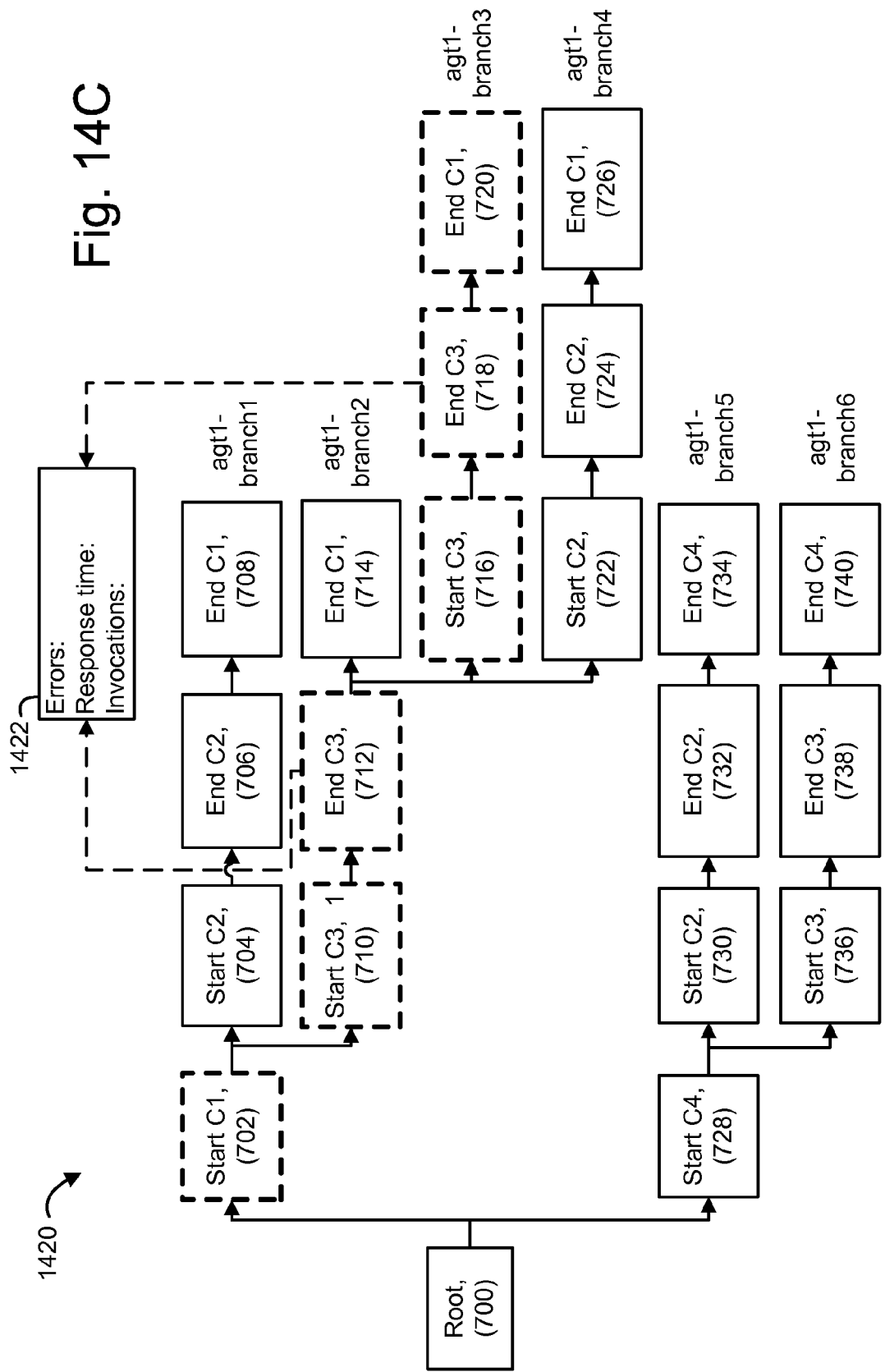
FIG. 14C depicts an example user interface based on the tree data structure of FIG. 13C.

FIG. 14C depicts an example user interface based on the tree data structure of FIG. 13C. In the UI display 1420, heavy long-dashed lines are used for nodes 702, 710, 712, 716, 718 and 720 to identify agt1-T3. A region 1422 provides the metrics regarding the component instance represented by nodes 712 and 718, based on data gathered by the gatherer 1206. The metrics can include, e.g., errors, average response time and number of invocations of the multiple occurrences of C3 in the context of the transaction agt1-T3.

Similar UIs can be provided for other subsystems. A UI can also combine nodes from multiple subsystems, such as discussed in connection with FIGS. 7C1 and 7D.

FIG. 15A depicts an example user interface consistent with FIG. 5B and FIG. 14A. The UI 1500 is a directed graph which includes a tree data structure having nodes/vertices and arrows/edges connecting the nodes. Each node represents a component which is invoked, in contrast to the UIs of FIGS. 14A-C, where one node represents the start or end of the execution or invocation of a component. Each node can represent the component starting and stopping one or more times.

The nodes include a root node 1501, and in one path, a node 1502 for C1, a node 1504 for C2 or a node 1506 for C3, a node 1506 for C3, a node 1508 for C5, a node 1510 for C6 and a node 1512 for C7. Another path includes a node 1514 for C4 which in turn can call C2 or C3. An arrow/edge 1524 connects the nodes 1502 and 1504 and includes multiple edge portions. One edge portion 1520 indicates that C2 is called by C1 in the context of agt1-T1, while another edge portion 1522 indicates that C2 is called by C1 in the context of agt1-T4. Further, the edge portions 1520 and 1522 can have different visual characteristics such as color, pattern or thickness, based on their respective associated metrics. Each edge portion can be associated with one of more of the gatherers and thereby with the metrics collected by the one or more of the gatherers.

In the example provided, the edge portions 1520 and 1522 are visually distinguished from one another by thickness, e.g., based on the number of invocations of the same component (C2) which are attributable to one transaction (agt1-T4) versus a number of invocations of the same component which are attributable to the another transaction (agt1-T4). In this case, edge portion 1520 is thicker, e.g., wider, than edge portion 1522. For instance, edge portion 1520 being twice as thick as edge portion 1522 would indicate that C1 was invoked twice as many times by C1 in agt1-T1 than in agt1-T4.

In another example, the relative thicknesses of the edge portions 1520 and 1522 is based on a number of errors of C2 which are attributable to agt1-T4 versus a number of errors of C2 which are attributable to agt1-T4. In yet another example, the relative thicknesses of the edge portions 1520 and 1522 is based on an average response time of C2 which is attributable to agt1-T4 versus an average response time of C2 which is attributable to agt1-T4.

In another example, a hotter color such as red can be used to indicate a relatively high number of invocations while a cooler color such as blue indicates a relatively low number of invocations. In another approach, red indicates a relatively high number of errors or a relatively high average response time, while blue indicates a relatively low number of errors or a relatively low average response time. Many other options are possible.

Additionally, display regions 1524 and 1526 provide metrics associated with edge portions 1520 and 1522, respectively. Each edge portion 1520 and 1522 is thus decorated with at least one metric. The display region 1524 indicates a "caution" state of an alert which has been set for the average response time of agt1-T1. This state might be set when the average response time exceeds a threshold, for instance. Generally, alerts can be set for the overall performance of a managed computing device and for calls made by a managed computing device, e.g., to another managed computing device or to an uninstrumented back end device. These alerts can be created and configured by a user. An alert can also be defined for a Business Transaction. If an alert is defined, it can appear in one of several states, such as normal (green), caution (yellow) or danger (red). An alert can be set for the transaction-segregated metrics which are obtained by a gatherer so that the alert is also specific to one or more specified transactions. This provides useful information that assists the user in understanding and diagnosing the system.

The UI could allow the user to click on, or otherwise select, a textual description of one of the metrics in one of the display regions 1524 or 1526 to cause the widths or other visual characteristic of the edge portions to reflect the selected metric. Or, another UI device such as a pull down menu can allow the user to configure the UI as desired. The UI can also filter out data which does not meet one or more specified criterion, such as by filtering out data which is not within a time period of interest. The UI can present data based on one or more reporting agents/subsystems as selected by a user.

The paths between the other nodes in the UI could similarly be enhanced based on available transaction-segregated metrics. The UI can also allow the user to view transaction traces such as in FIGS. 11A and 11B. For example, the UI can provide a list of individual transactions which are used to provide the UI of FIG. 15A or 15B, and select one of the transactions to view the corresponding transaction trace.

The ability to segregate performance metrics of a component by transaction or group of transaction allows the operator to more readily understand the performance of the application and diagnose problems, relative to that component. For example, an approach which does not use transaction-segregated metrics could only indicate that the component C1 has an unusually high average response time. In contrast, based on the transaction-segregated metrics, the UI can indicate average response times for the each of the transactions agt1-T1 and agt1-T4 to perhaps determine that one of the transactions but not the other is causing the slow response time.

As another example, assume a managed computing device of an e-commerce web site performs transactions including allowing a customer to shop for an item to buy, and processing a payment of the customer. Or, assume the managed computing device performs transactions including allowing a customer to shop for different types of times. The ability to provide transaction-segregated metrics allows these two transactions to be analyzed separately. The approaches provided herein optimize the kind of data which is gathered and the process for gathering it.

FIG. 15B depicts an example user interface which is an alternative to FIG. 15A. The UI 1530 focuses on transactions of interest, which are agt1-T1 (denoted by icon 1532) and agt1-T4 (denoted by icon 1534) in this example. Node 1536 for C1 represents the first component in the transactions, and node 1537 for C3, or node 1538 for C2, either of which is called by C1, represent the second components in the transactions. An edge 1545 includes edge portions 1542 and 1544 which are visually distinguished from one another such as by their relative widths as discussed in connection with FIG. 15A. Metrics display regions 1540 and 1546 can be linked to edge portions 1542 and 1544, respectively.

FIG. 15C depicts another example user interface. In this UI 1560, the level of detail provided is the level of the managed computing device rather than the level of a software component of an application running on the device. The managed computing devices are applications servers, denotes by nodes 1574 and 1576, which may correspond to servers 103 and 109 of FIG. 1A, for instance. The UI 1560 focuses on transactions of interest, which are generically referred to Transaction1 (T1) (denoted by icon 1562) and Transaction2 (T2) (denoted by icon 1564) in this example. Application server 1576 is called by application server 1574 in connection with T1 and T2 as indicated by edge portions 1568 and 1570, respectively, of an edge 1575. Edge portions 1568 and 1570 are visually distinguished from one another such as by their relative widths as discussed previously. Metrics display regions 1566 and 1572 can be linked to edge portions 1568 and 1570, respectively. Of course, the UI can display two or more arrows between nodes, and more than two nodes. In practice, a complex UI can be obtained with hundreds or even thousands of nodes based on metrics which are obtained over a time period of days. Such a UI allows a user to visually detect trends. For example, if the UI uses a hotter color such as red to denote transactions with relatively slow response times, the user can detect the red edges, and adjust the UI to magnify areas which have a red edge to further investigate the problem. Similarly, the UI could allow the user to see areas in which invocations are relatively high.

An automated report could also be provided, e.g., in the form of a list. The list could identify components and/or managed computing devices for which metrics indicate there is a problem, along with identifying the associated transactions.

FIG. 16A depicts an example process in which an agent obtains transaction-segregated metrics for at least one application. Step 1600 includes the agent maintaining a tree data structure with branches which represent sequences of invoked components of at least one application, such as by start and stop points of the components. The agent also maintains one or more gatherers which are linked to one or more nodes of the branches. Step 1602 includes, during a transaction, identifying a sequence of invoked components of the at least one application, and obtaining metrics of the invoked components. For example, this can include tracing the transaction. Step 1604 includes identifying a matching branch in the tree data structure. Step 1606 includes identifying transaction-segregated metrics for one or more of the nodes which are linked to the one or more gatherers. Step 1608 includes reporting the transaction-segregated metrics, the identifier of the matching branch and the identifier of the one or more gatherers, from the agent to the manager. As mentioned, the metrics can be reported periodically such as every few minutes, in which case metrics for many transactions will typically be obtained and reported. At step 1610, the agent can discard, and not report to the manager, metrics which are not identified to be transaction-segregated at step 1606. Optionally, the agent can report the non-transaction-segregated metrics. In one approach, a reduced set of metrics is reported when there is no transaction-segregation.

FIG. 16B depicts an example process in which a manager provides a user interface based on a report of transaction-segregated metrics from an agent, in correspondence with the process of FIG. 16A. Step 1620 includes maintaining a tree data structure of the manager with branches which represent sequences of invoked components of at least one application. Step 1622 includes receiving one or more reports of transaction-segregated metrics, identifiers of matching branches and an identifier of one or more gatherers. Step 1624 includes, based on the identifiers of the matching branches, identifying sequences of invoked components of transactions. Step 1626 includes, based on the identifiers of the one or more gatherers, accessing transaction-segregated metrics. Step 1628 includes providing a user interface (UI) depicting the transactions and the associated transaction-segregated metrics, such as depicted in FIGS. 14A-15B. For example, the transaction-segregated metrics can be provided as in regions 1402, 1404, 1412, 1422, 1524, 1526, 1540 and 1546. The UI also sets visual characteristics of edge portions (such as 1520, 1522, 1542 and 1544 in FIGS. 15A and 15B) based on the transaction-segregated metrics.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method, the method comprising:
   accessing a tree data structure for an application, wherein:
   the tree data structure comprises respective branches including a first branch and a second branch,
   the first branch represents a first transaction of the application, and comprises a plurality of nodes which represent a start and end of invocation of a plurality of components of the first transaction, including a first component,
   the plurality of nodes of the first branch comprises a first node which represents a start or end of invocation of the first component in the first transaction, the first node is linked to a first gatherer,
   the second branch represents a second transaction of the application, and comprises a plurality of nodes which represent a start and end of invocation of a plurality of components of the second transaction, including the first component, and
   the plurality of nodes of the second branch comprises a second node which represents a start or end of invocation of the first component in the second transaction, the second node is linked to a second gatherer,
   tracing the application to detect a sequence of invoked instrumented components of the application, the tracing comprising detecting a start and an end of an invocation of the first component in the first transaction;
   gathering a first metric of the first component in the first transaction based on the detecting the start and the end of the invocation of the first component in the first transaction;
   determining that the sequence of invoked instrumented components of the application matches the plurality of nodes of the first branch; and
   responsive to the determining that the sequence of invoked instrumented components of the application matches the plurality of nodes of the first branch: reporting, to a manager, the metric for the first component in the first transaction with an identification of the first gatherer.

2. The computer-implemented method of claim 1, wherein:
the metric is reported to the manager with an identifier of the first branch, thereby linking the metric to the first transaction.

3. The computer-implemented method of claim 1, wherein:
the determining that the sequence of invoked instrumented components of the application matches the plurality of nodes of the first branch comprises determining that the invocation of the first component in the first transaction was made via a specified entry point which is associated with the first branch.

4. The computer-implemented method of claim 1, wherein:
the first gatherer is part of an agent which performs the tracing, gathering, determining and reporting.

5. The computer-implemented method of claim 1, wherein:
the metric comprises an error count of the first component in the first transaction.

6. The computer-implemented method of claim 1, wherein:
the metric comprises a count of invocations of the first component in the first transaction.

7. The computer-implemented method of claim 1, wherein:
the metric comprises an average response time for invocations of the first component in the first transaction.

8. The computer-implemented method of claim 1, wherein:
the metric provides a count of concurrent invocations of the first component in the first transaction and in the second transaction.

9. The computer-implemented method of claim 1, further comprising:
   further tracing the application to detect a second sequence of invoked instrumented components of the application, the further tracing comprising detecting a start and an end of an invocation of the first component in the second transaction;
   gathering a metric of the first component in the second transaction based on the detecting the start and the end of the invocation of the first component in the second transaction;
   determining that the second sequence of invoked instrumented components of the application matches the plurality of nodes of the second branch; and
   responsive to the determining that the second sequence of invoked instrumented components of the application matches the plurality of nodes of the second branch: reporting, to the manager, the metric for the first component in the second transaction with an identification of the second gatherer.

10. The computer-implemented method of claim 9, wherein:
- a context of the first gatherer is linked to the first transaction and
- a context of the second gatherer is linked to the second transaction.

11. The computer-implemented method of claim 1, wherein:
- the first node of the first branch is not linked to the second gatherer so that the metric for the component in the first transaction is not linked to a context of the second gatherer; and
- the second node of the second branch is not linked to the first gatherer so that the metric for the component in the second transaction is not linked to a context of the first gatherer.

12. The computer-implemented method of claim 1, wherein:
- the first node of the first branch represents a start or an end of a second invocation of the first component in the first transaction.

13. The computer-implemented method of claim 1, further comprising:
- providing a user interface based on the reporting, the user interface comprises a directed graph comprising vertices connected by edges, the edges comprising an edge comprising a first edge portion which represents the first transaction and a second edge portion which represents the second transaction, and the first edge portion is visually distinguished from the second edge portion.

14. The computer-implemented method of claim 13, wherein:
- the directed graph depicts the first edge portion based on an identifier of the first branch and the second edge portion based on an identifier of the second branch.

15. The computer-implemented method of claim 13, wherein:
- the first edge portion is decorated with the metric for the first transaction, and the second edge portion is decorated with a metric for the second transaction.

16. The computer-implemented method of claim 13, wherein:
- the first edge portion is visually distinguished from the second edge portion to indicate a number of invocations of the first component which are attributable to the first transaction versus a number of invocations of the first component which are attributable to the second transaction.

17. The computer-implemented method of claim 16, wherein:
- the first edge portion is visually distinguished from the second edge portion by thickness.

18. The computer-implemented method of claim 1, wherein:
- the first branch comprises nodes which represent repeated invocations of the first component in the first transaction.

19. A tangible processor-readable storage device comprising computer readable software embodied thereon for programming a processor to perform a method, the method comprising:
- tracing respective transactions of an application, the tracing detects a sequence of invoked instrumented components of the application in a first transaction and a sequence of invoked instrumented components in a second transaction, the sequence of invoked instrumented components in the first transaction comprises a first instance of a component and the sequence of invoked instrumented components in the second transaction comprises a second instance of the component;
- determining that the first instance of the component was detected in a context of the first transaction, the determining that the first instance of the component was detected in the context of the first transaction comprises determining that there is a match between the sequence of invoked components in the first transaction and a sequence of nodes in a data structure which represents the first transaction, the sequence of nodes in the data structure which represents the first transaction comprising nodes representing, for each component of a plurality of components, a start of invocation and an end of invocation;
- determining that the second instance of the component was detected in a context of the second transaction, the determining that the first instance of the component was detected in the context of the second transaction comprises determining that there is a match between the sequence of invoked components in the second transaction and a sequence of nodes in a data structure which represents the second transaction, the sequence of nodes in the data structure which represents the second transaction comprising nodes representing, for each component of a plurality of components, a start of invocation and an end of invocation;
- gathering a first metric of the component in the first transaction using a first gather;
- gathering a second metric of the component in the second transaction using a second gather;
- responsive to the determining that the first instance of the component was detected in the context of the first transaction: reporting the first metric to a manager in the context of the first transaction; and
- responsive to the determining that the second instance of the component was detected in the context of the second transaction: reporting the second metric to the manager in the context of the second transaction, wherein:
- the context of the first transaction is distinct from the context of the second transaction, the reporting the first metric in the context of the first transaction comprises reporting an identification of the first gatherer, and
- the reporting the second metric in the context of the second transaction comprises reporting an identification of the second gatherer.

* * * * *